United States Patent
Berg

(10) Patent No.: US 10,266,095 B1
(45) Date of Patent: Apr. 23, 2019

(54) MOBILE CART CADDY WORKSTATION SYSTEM

(71) Applicant: W.B. Ventures, LLC, Greenland, NH (US)

(72) Inventor: Wallace S. Berg, Greenland, NH (US)

(73) Assignee: W.B. Ventures, LLC, Greenland, NH (US)

(*) Notice: Subject to any disclaimer, the term of this patent is extended or adjusted under 35 U.S.C. 154(b) by 0 days.

(21) Appl. No.: 16/027,774

(22) Filed: Jul. 5, 2018

(51) Int. Cl.
| | |
|---|---|
| *B60P 3/14* | (2006.01) |
| *B62B 5/06* | (2006.01) |
| *B62B 3/02* | (2006.01) |
| *B62B 3/00* | (2006.01) |
| *B62B 5/00* | (2006.01) |

(52) U.S. Cl.
CPC ............... *B60P 3/14* (2013.01); *B62B 3/004* (2013.01); *B62B 3/005* (2013.01); *B62B 3/02* (2013.01); *B62B 5/0079* (2013.01); *B62B 5/067* (2013.01); *B62B 5/068* (2013.01); *B62B 2202/48* (2013.01)

(58) Field of Classification Search
CPC .. B60P 3/14; B60P 1/6418; B60P 3/00; B60P 1/00; B60P 1/38; B60P 1/42; B60P 1/43; B60P 1/483; B60P 1/6427; B60P 3/002; B60P 3/025; B60P 3/07; B60P 3/122; B60P 3/32; B60P 7/06
See application file for complete search history.

(56) References Cited

U.S. PATENT DOCUMENTS

| | | | | |
|---|---|---|---|---|
| 5,135,277 A * | 8/1992 | Pearson | ..................... | B60P 3/14 211/198 |
| 5,383,698 A * | 1/1995 | Buchholz | .................. | B60P 3/14 296/26.03 |
| 5,577,428 A * | 11/1996 | Rueb | ..................... | B23D 47/02 144/286.5 |
| 8,061,395 B1 * | 11/2011 | Atkinson | .................. | B25H 1/04 144/285 |
| 2004/0070227 A1* | 4/2004 | Pape | ......................... | B60P 3/14 296/25 |
| 2006/0214446 A1* | 9/2006 | Johns | ........................ | B60P 3/14 296/24.32 |
| 2011/0239952 A1* | 10/2011 | Merritt | .................... | A01K 31/18 119/300 |

* cited by examiner

*Primary Examiner* — James A Shriver, II
*Assistant Examiner* — James J Triggs
(74) *Attorney, Agent, or Firm* — Sarita L. Pickett

(57) ABSTRACT

A mobile cart caddy workstation system capable of facilitating organized transportation of tools of minimal sizes, medium sizes, and larger sizes by a single towing apparatus and at least one cart or wagon. More particularly, a mobile cart caddy workstation system having a cart connector which connects a rear axle of a first cart with a forward axle of a second cart, the first and second carts supporting a work platform and a caddy deck.

15 Claims, 20 Drawing Sheets

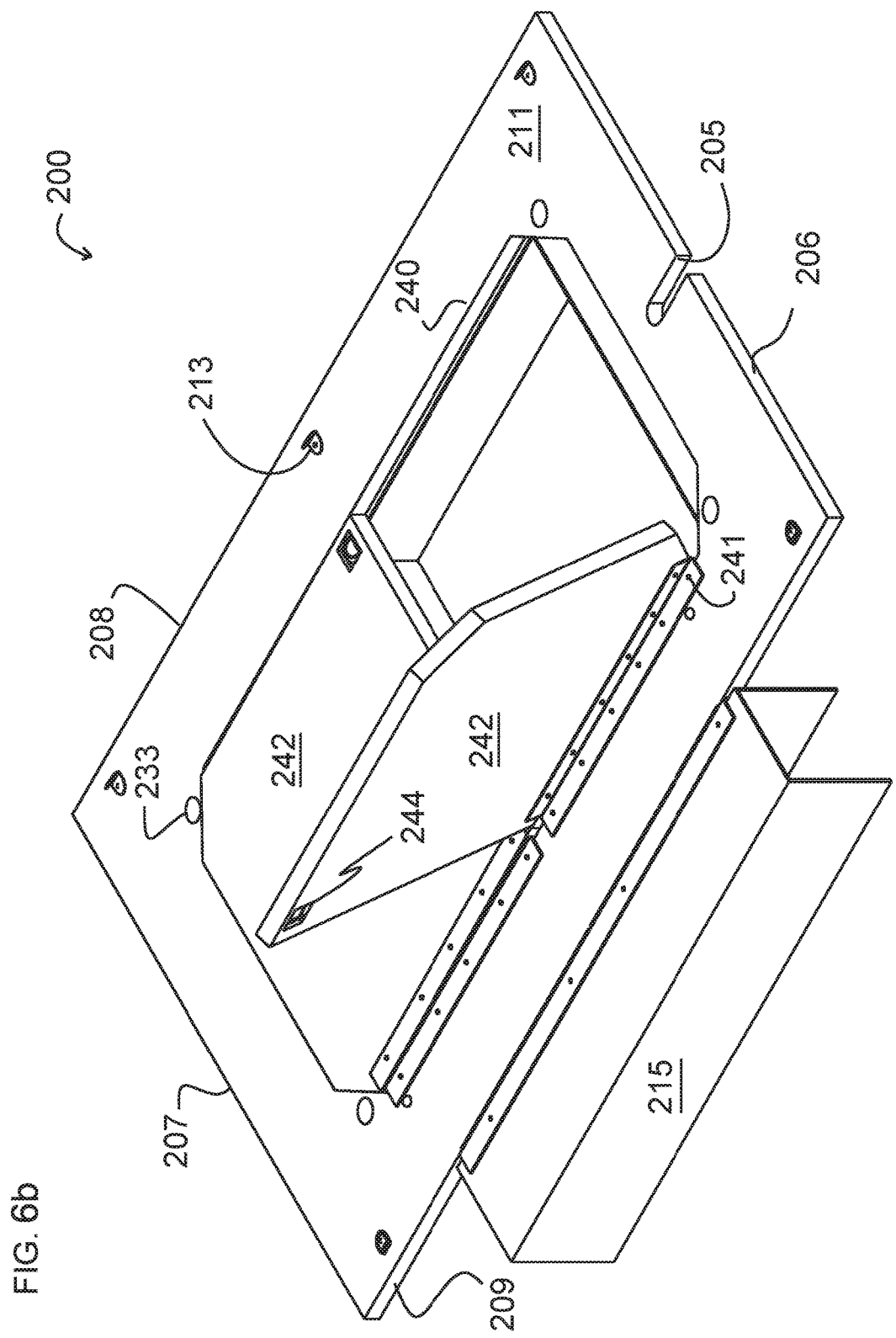

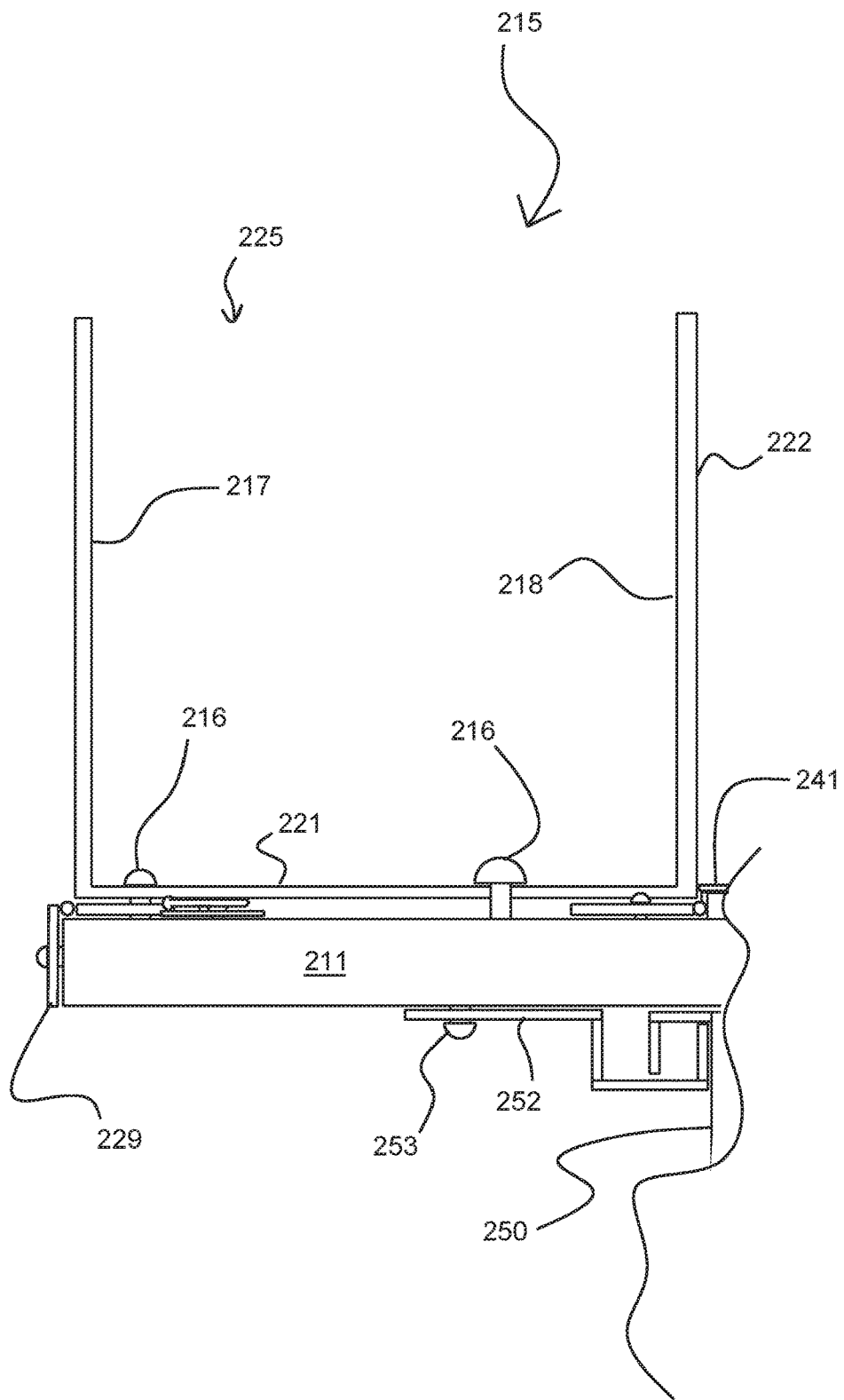

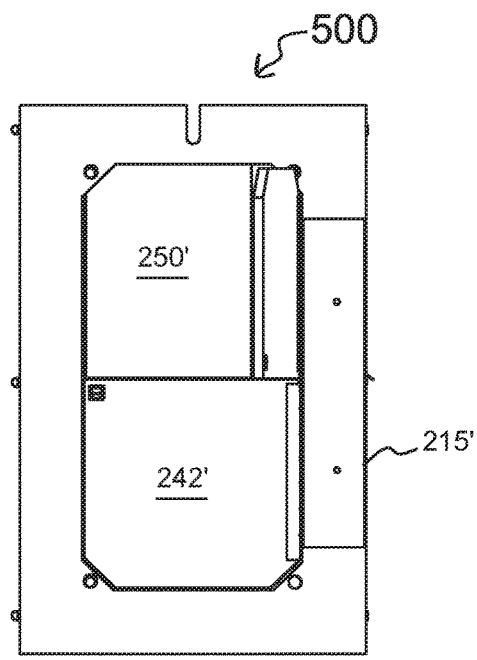
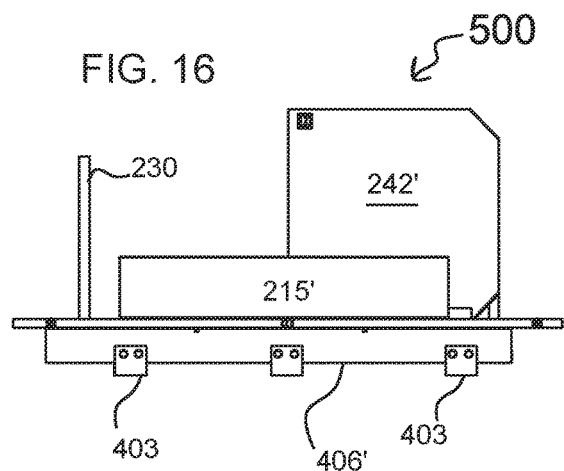
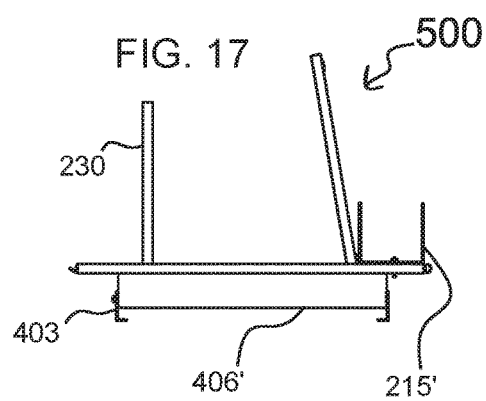
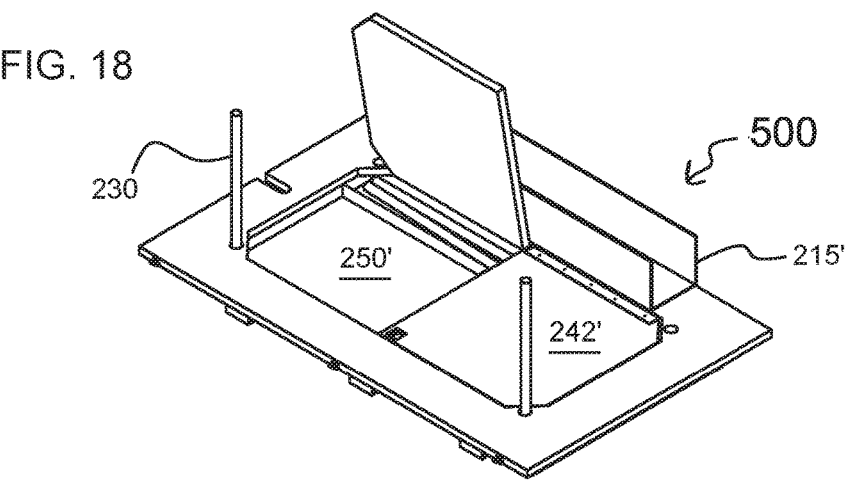

MOBILE CART CADDY WORKSTATION SYSTEM

BACKGROUND OF THE INVENTION

1. Field of the Invention

The present invention relates generally to utility carts and wagons. Particularly, the present invention relates to mobile workstations for property maintenance.

2. Description of the Prior Art

Trailers are widely used in construction, maintenance, industrial, and household operations. Conventional trailers typically include a bed or bucket portion and a wheel assembly attached to the bed.

One approach of a trailer apparatus is disclosed in U.S. Pat. No. 6,962,370 to Simpson. The Simpson patent describes a collapsible utility trailer with a trailer bed, trailer frame, front pair of wheels, and rear pair of wheels. The trailer bed has at least two bed sections and a plurality of frame sections. The wheels are rotatably attached to the trailer frame oriented substantially below the trailer bed.

Dodson, U.S. Pat. No. 5,340,134 and Davis, U.S. Pat. No. 4,746,142, each disclose a trailer with a bed formed from two sections that are pivotally attached to each other. Pivoting the bed sections toward each other creates a recess that is adapted to retain the other portions of the trailer such as the wheels and the handle.

Harper, U.S. Pat. No. 4,786,073, and Burris, U.S. Pat. No. 4,239,258, both describe a trailer having a front bed section, a middle bed section and a rear bed section. The front and rear bed sections are pivotally attached to the middle bed section to reduce the size of the trailer for storage.

Another approach is described in U.S. Pat. No. 4,768,806 to Tétreault. Tétreault discloses a trailer with a two-part bed. The two sections of the bed pivot upwardly along the center of the trailer, which permits the wheels to move towards each other to reduce the size of the trailer for storage.

SUMMARY OF THE INVENTION

Carts can be used to store and carry a variety of tools, materials, and various supplies. However, carts are often used in applications which would benefit from a work space when such a work space is not readily available. Moreover, carts offer limited space and would benefit from a mechanism to couple additional carts to improve capacity. Previous methods can be improved by further providing a cart caddy and brace system. The present invention substantially meets the aforementioned needs of the industry.

It is an object of the present invention to provide a mobile workspace and mobile workstation system.

It is another object of the present invention to provide additional points on a cart for additional equipment and materials to be attached.

It is yet another object of the present invention to provide a cart trailer attachment which offers protection for the items within the trailer.

More specifically, it is an object of the present invention to provide a portable workstation system for use with a first utility wagon, having upwardly extending side rails, and a second utility wagon, having a convertible handle. The workstation system having a work platform capable of being mounted upon one of the first and second utility wagons. The work platform having at least one lid capable of reversibly sealing and revealing a basket space accessible through a hatch within the work platform.

A caddy deck capable of being mounted upon an other one of the first and second utility wagons. The caddy deck having a drainage aperture at one mouth of a wind tunnel created by interaction of the caddy deck and the other one of the first and second utility wagons. A cart connector capable of releasably engaging a frame portion of a first cart and a handle portion of a second cart. The workstation system being capable of transforming between a transportation configuration and a working configuration.

The portable workstation system further having a tool holster releasably secured along an upwards surface of one of the work platform and the caddy deck.

The caddy deck possibly having upward extending ribs along a periphery of the caddy deck; fasteners capable of releasably securing and maintaining cords thereto; and supporting ribs along an underside of the caddy deck having a plurality of metal brackets spaced apart from one another.

The portable workstation system also possibly having a railing system of one of the work platform and the caddy deck. The railing system having a plurality of apertures located about a perimeter of the one of the work platform and the caddy deck; a plurality of rails, corresponding to the plurality of apertures, each of the plurality of rails having a diameter less than a diameter of the plurality of apertures; a plurality of supports associated with each of the plurality of apertures located about the perimeter of the one of the work platform and the caddy deck, such that each of the plurality of rails may be supported upwards when vertically extending through a respective one of the plurality of apertures when the workstation system is in the transportation configuration; and a compartment of the one of the work platform and the caddy deck, capable of storing the rails horizontally when the workstation system is in the working configuration.

The portable workstation system possibly having an adjustable support system for releasably mounting one of the work platform and the caddy deck upon one of the first and second utility wagons. The adjustable support system possibly having at least one F-channel support frame adjustably secured to a bottom surface of the one of the work platform and the caddy deck; a plurality of elongated apertures extending through the at least one support frame perpendicular to a channel length; and a plurality of screws, each of the plurality of screws extending through a respective one of the plurality of elongated apertures, the plurality of screws capable of retaining the at least one F-channel in sliding engagement with the one of the work platform and the caddy deck.

The portable workstation system possibly having a transportation configuration capable of providing organized transportation of tools of at least three different sizes by a single towing apparatus.

The portable workstation system possibly having a railing system capable of carrying items of between 6 to 18 feet long; an upper deck fastening system capable of carrying items of between 4 to 6 feet; an internal basket space capable of carrying items of between 2 to 4 feet; and a drawer capable of carrying items of less than 2 feet.

The portable workstation system possibly having a cart connector with a first bracket capable of releasably engaging the frame portion of the first cart; a second bracket capable of releasably engaging the handle portion of the second cart; and an extension shaft extending between the first bracket and the second bracket. The first bracket is an L-shaped bracket; the second bracket is a flat bracket having apertures at a first end; the extension shaft is an extension of a second end of the second bracket; and the first bracket is welded to the extension shaft opposite the second bracket.

It is yet another object of the present invention to provide a method for providing organized transportation of tools of at least three different sizes by a single towing apparatus, and simultaneously providing a portable workstation system for a first utility wagon and a second utility wagon. The first utility wagon being pulled by the single towing apparatus. The method possibly having steps including: securely attaching a first frame portion of the first utility wagon to a second frame portion of the second utility wagon via a cart connector by: releasably engaging the first frame portion of the first utility wagon with a first bracket along one end of the cart connector; and releasably engaging the second frame portion of the second utility wagon with a second bracket of the cart connector, the second bracket being opposite the first bracket along an extension shaft; releasably engaging a work platform, having a small tool drawer, on one of the first and the second utility wagons; and releasably securing a caddy deck onto an other of the first and the second utility wagons.

The method for providing a portable workstation system might also have steps for supporting a tool holster along an upwards working surface of the work platform; and accessing the small tool drawer and a basket space by a hatch within the work platform via rotation of at least one lid of the work platform.

The method for providing a portable workstation system might also have steps for releasably securing the caddy deck onto the other of the first and the second utility wagons via supporting ribs along an underside of the caddy deck having a plurality of metal brackets spaced apart from one another; releasably securing and maintaining cords with fasteners attached to upward extending ribs along a periphery of the caddy deck; and creating a wind tunnel by providing a drainage aperture along an upper supporting surface of the caddy deck.

The method for providing a portable workstation system might also have steps for facilitating moving the work platform from the first utility wagon to the second utility wagon, the first utility wagon having a width less than a width of the second utility wagon by: loosening screws adjustably supporting an F-channel support along a bottom surface of the work platform; sliding the F-channel support toward outer edges of the work platform until reaching a position corresponding to the width of the second utility wagon; and tightening the screws adjustably supporting the F-channel support.

The method for providing a portable workstation system might also have steps for converting the portable workstation system into a working configuration by disengaging the first frame portion of the first utility wagon from the second frame portion of the second utility wagon via the cart connector; and converting the portable workstation system back into a transporting configuration by re-engaging the first frame portion of the first utility wagon to the second frame portion of the second utility wagon via the cart connector.

BRIEF DESCRIPTION OF THE DRAWINGS

FIG. 6b illustrates the work platform of FIG. 6 having an open basket configuration.

FIG. 7 illustrates a cut-away close-up of the tool holster of the work platform of FIG. 6.

FIG. 15 is a top view of the hybrid deck of FIG. 14.

FIG. 16 is a right-side view of the hybrid deck of FIG. 14.

FIG. 17 is a rear view of the hybrid deck of FIG. 14.

FIG. 18 is a top, rear, left-side, elevated perspective view of the hybrid deck of FIG. 14.

DETAILED DESCRIPTION OF THE PRESENT INVENTION

Figure 1:
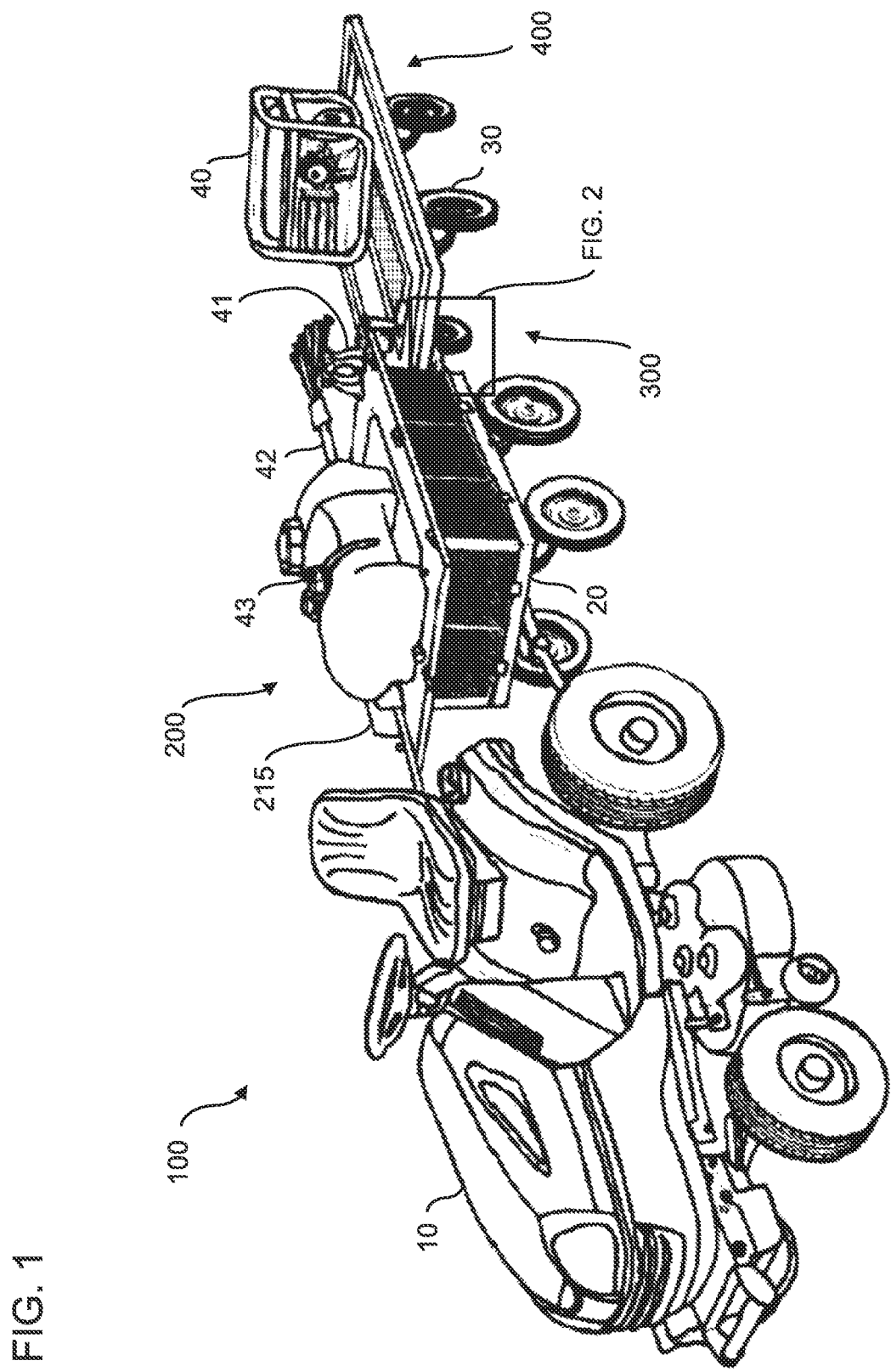
FIG. 1 is a front-elevated perspective view of a mobile workstation system having the work platform, the caddy deck, and the cart connector according to one embodiment of the present invention.

Property maintenance requires the use of many hand and power tools. These tools must be transported to remote work locations over difficult terrain with narrow spaces through wooded areas and tight turns around streams, etc. Wheel barrows can navigate those narrow spaces and tight turns, but these must be pushed, resulting in weary workers before the real work has even begun. One option is the use of a small lawn mower or small tractor pull which is capable of towing small carts. These smaller vehicles are capable of navigating narrow spaces, tight turns, and difficult terrain. However, being smaller, these vehicles provide no room for carrying work tables, and one must make several trips to carry all of the desired tools.

Several users have tried to solve this problem by using pick-up trucks or other similar all-terrain vehicles. Pick-up trucks have the space, and the power, but their larger size means that they often have difficulty in traveling via off-road terrain and/or through narrow spaces. Tractor buckets can handle the terrain, but again face difficulties navigating through narrow spaces, and if multiple trips are required, the tires will often negatively affect the very landscape that is being maintained. For these reasons, and others, none of the current options are ideal or even especially efficient for addressing the current needs.

The present invention addresses these difficulties of the prior art by providing a mobile workstation system capable of meeting the needs of any commercial landscape company servicing the public, any property owner having more than half an acre, any company or institution with grounds requiring maintenance, etc. Similarly, any builder, brick layer, or craftsman would also likely find the portable and mobile work platforms according to the present invention to be an asset for both labor and time efficiency.

For example, the inventor had a mini-farm with about 2000 feet of fence line along two brooks which was overgrown with weeds. A prototype caddy was mounted on a cart, and a 15-gallon electric sprayer was then mounted on the caddy deck and a golf cart (with 12V power) was used to pull the cart. Unlike with previous systems, the prototype mobile workstation system enabled the job to be completed in less than two hours.

One of the benefits of the present system is the versatility provided by the multiple components and sub-systems thereof. Not every aspect of the system is necessary for every utilization, and for this reason, not every embodiment of the present invention will have every component of the mobile workstation system, and not every component will have every aspect of each component. For purposes of description then, please note that these various aspects and components are interchangeable regardless of embodiment, unless otherwise stated. It should also be noted that in order to reduce redundancy within the specification, not every aspect of each component will be fully described with respect to each particular figure that illustrates that component. Instead, detailed descriptions of a particular component are provided with respect to those figures in which those details are more clearly illustrated.

Mobile Workstation System 100

An example of proposed use of a first embodiment of the present invention is illustrated in FIGS. 1-4. Specifically, FIG. 1 shows a towing apparatus 10 pulling a bucket cart 20, i.e., a cart which has upright sidewalls 21 extending from a frame 22. A mobile workstation system 100 according to the present invention has a cart connector 300 which connects a rear axle 27 of the bucket cart 20 with a forward axle 25 of a flat-bed cart 30, i.e., a cart one without upright sidewalls 21.

Transportation Configuration

In the transporting configuration 101, the mobile workstation system 100 is capable of facilitating organized (separate, distinct, and simultaneous) transportation of tools of minimal sizes (from about 1 in$^3$ to about 3 in×19 in×22 in), medium sizes (from about 4 in$^3$ to about 22 in×44 in×14 in), and larger sizes (greater than 15 in$^3$) by a single towing apparatus 10. Generally, the towing apparatus 10 is a smaller sized personal rugged terrain vehicle or all-terrain vehicle (ATV) capable of handling atypical paths and off-road traveling such as a golf cart, lawn mower, quad, quad bike, three-wheeler, four-wheeler or quadricycle. Shown here, the towing apparatus 10 is a lawn mower capable of handling these two lawn carts with about 1200 lb capacity each.

Note that the upwards capability of the vehicles towing capacity is not limited by the engine and transmission's ability to create a maximum axle torque, but instead, by that particular vehicle's "braking ability". For example, most residential lawn & garden tractors have a transaxle discbrake designed to stop the weight of the tractor on slight grades. Thus, when towing downhill, the braking distance required will significantly increase which creates an effective upward limit of weight capable of being carried by the mobile workstation system 100. Thus, the mobile workstation system 100 is generally capable of facilitating transportation and carrying of between about 5,000 lbs and about 20 lbs of weight, and more preferably, between about 2,000 lbs and about 1,000 lbs of weight.

For example, in this embodiment, supported by an upper surface 201 of a work platform 200, a canister 43 is filled with a fluid weed killer. This canister 43 is a twenty-five-gallon spot sprayer having an empty shipping weight of roughly about 78 pounds with a full weight of about 300 lbs. Shown here, this canister 43 features a 12 volt 2.1 gpm pump and pressure gauge, 15 feet of ⅜ inch hose, and low-profile polyethylene tank with molded recesses on tank ends for handles or hose storage. This canister 43 also features a 5-inch screw-on cap for easy filling, molded gallon marks and six molded inserts on the bottom for easy installation. A 12V diaphragm pump draws 10 amps and the canister has an adjustable pressure range of 0-60 psi for easy calibration. The canister features a 36"L×18"W×17"H tank and a standard 18" aluminum spray gun with trigger lock. A five-nozzle boom kit with a 100" swath (not shown) is stored within the basket space 260 accessible through the hatch 240 of the work platform 200.

Adjacent this canister 43, a tool holster 215 is shown supporting a rake 42 having a tool handle with a length greater than the length of the bucket or basket space 260 of the first cart 20. Similarly, the tool attachment system 212 of the caddy deck 400 retains the electric generator 40. The tool holster 215 and tool attachment systems 212 enable the canister 43, the generator 40, the rake 42 and/or other similar larger tools and cannisters to be releasably and securely attached to the upper surface 201, 401 of the work platform 200 or the caddy deck 400.

Figure 2:
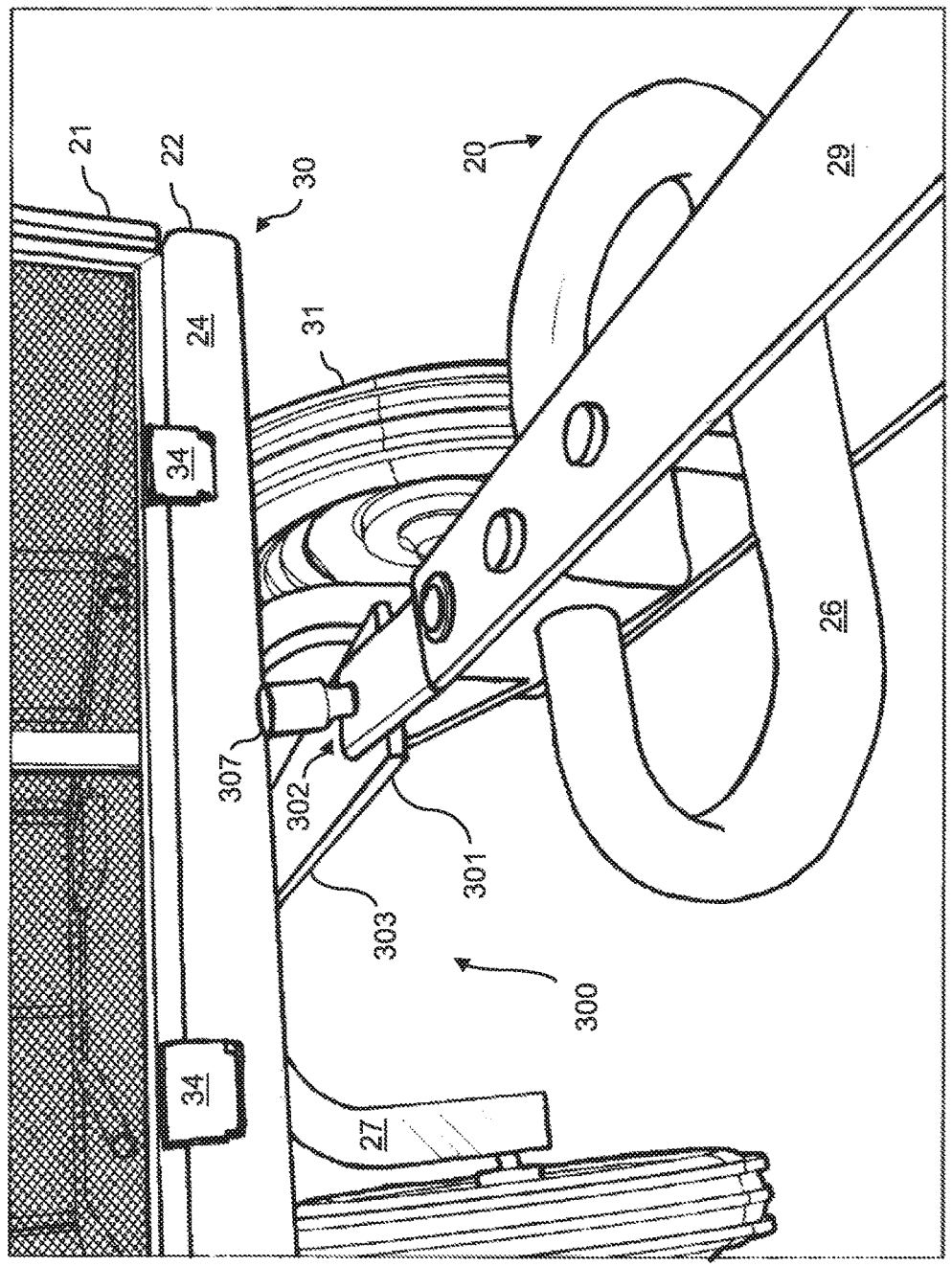
FIG. 2 is a partial close-up rear-elevated perspective view of the mobile workstation system of FIG. 1 showing the cart connector in an attached configuration.

FIG. 2 is a partial elevated rear perspective close-up view of the cart connector 300 shown in FIG. 1. Specifically, FIG. 2 shows the cart connector 300 in an attached configuration such that the overall mobile workstation system 100 is still in the transporting configuration 101. The rear end 24 of the bucket cart 20 and the handle 26 of the flat-bed cart 30 are connected to one another via the cart connector 300. The extension shaft of the cart connector 300, extends from an axle bracket 309 (not shown here) connected to the rear axle 27 of first trailer cart 20.

A quick release pin 307 extends through a connecting aperture 302 positioned in the extension connecting end 301 and apertures in the handle 26. Thus, the cart connector 300 facilitates connecting a rearward placed cart 30 to a frontward placed cart 20.

Although not the focus of this illustration, also visible in FIG. 2 are the sidewalls 21 extending upwards from the rear 24 of the frame 22 of the bucket cart 20. Ridge hooks 34 extend downwards from the sidewalls 21 into apertures spaced at various intervals along the frame 22 and releasably connect the sidewalls 21 to the frame 22.

Another feature shown here that the present invention facilitates is a convertible handle 26. In the configuration shown in FIGS. 1-4, the present invention facilitates conversion of a convertible handle 26 adapted for manually towing the second trailer cart 30. This convertible handle 26 is capable of converting between a first configuration for connecting to a towing apparatus 10, and a second configuration to allow towing by hand. An example of a preferred handle of this type could be one as described in U.S. Pat. No. 7,210,697, "Convertible Handle".

Working Configuration

Figure 3:
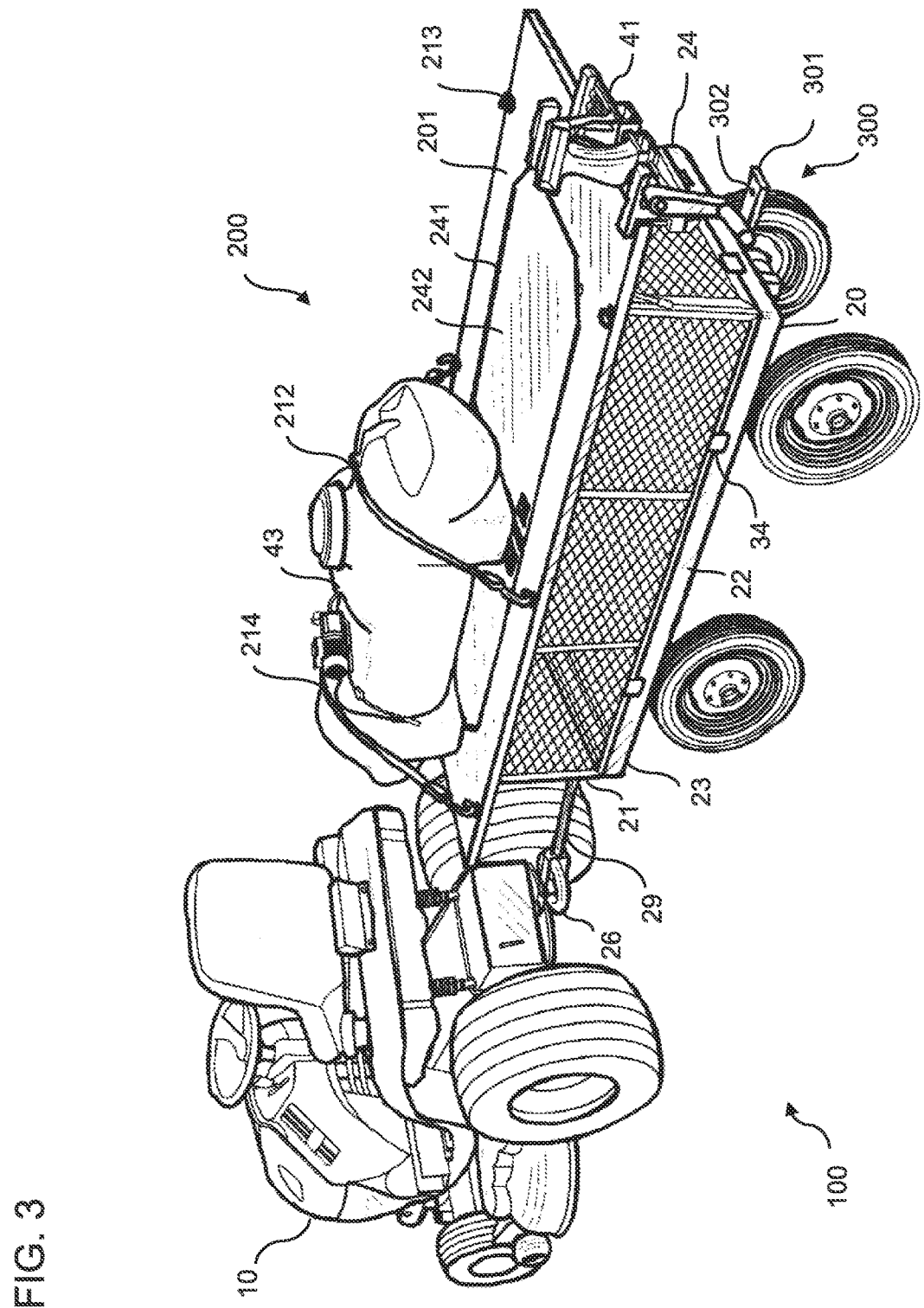
FIG. 3 is a rear-elevated perspective view of the mobile workstation system of FIG. 1 showing the cart connector in a detached configuration.

FIG. 3 shows the interoperability of two subsystems 200, 300 of the mobile workstation system 100 of FIG. 1. Specifically, FIG. 3 shows the cart connector 300, extending from the rear axle of first trailer cart 20, having facilitated a quick detachment of the rear cart 30 from the towing apparatus 10 and bucket cart 20 after the rearward placed cart 30 has been quickly released from attachment to the frontward placed cart 20. The quick release pins 216 of the tool holster 215 facilitated the quick detachment of the tool holster 215 and rake 42.

Facilitating quick detachment enables users to move quickly between a transportation configuration (shown in FIGS. 1-3) and a working configuration (shown in FIG. 4) of the mobile work station system 100. This enables easy access to the vice grip 41 which is securely attached along a peripheral overhanging portion 211 adjacent the rear end 207 of the work platform 200. Also note that when the cart connector 300 is in the detached configuration 305 and the work platform is in the working configuration, the upper working surfaces 201, 243 are accessible from at least three directions, the rear 207, the left side 208, and the right side 209.

Note that although the thickness of each lid hinge 241 is minimal, thin channels may be hollowed out from the peripheral portion 211 of the work platform 200 and the lids 242 for the hatch 240. These thin channels have a depth slightly greater than or equal to the thickness of the hinges ensuring that the upward surfaces of the lid hinges are commensurate with the upward surfaces of the peripheral portions and deck lids of the work platform.

Similar grooves are provided for the latches 244 for the first and second deck lids 242. The grooves for the latches 244 are shown rectangularly shaped but may also have complimentary shapes similar to the grooves for the fasteners 213. Regardless of shape, the grooves ensure that the hinges 241, lid latches 244, and fasteners 213 do not extend upwards beyond the upper surface of the work platform when laying flat in the working configuration for a smooth upper working surface.

Also facilitating the generally continuous nature of the upper working surface of the work platform when the lids 242 are closed, the first and second deck lids 242 and hatch 240 are shown having complimentary rectangular shapes. As shown in most embodiments, these lids and hatch may have complimentary beveled corners so as to facilitate the placement of four apertures 233 for the railing system 230 discussed in greater detail elsewhere in this discussion.

In this configuration, the tool holster 215 has been removed from the upper surface of the work platform 200 and placed within the internal basket space 260 so as to increase the available upper working surface of the work platform. If additional working space is needed, it is also possible to release the tethers 214 and then remove the canister 43.

Access Configuration

Figure 4:
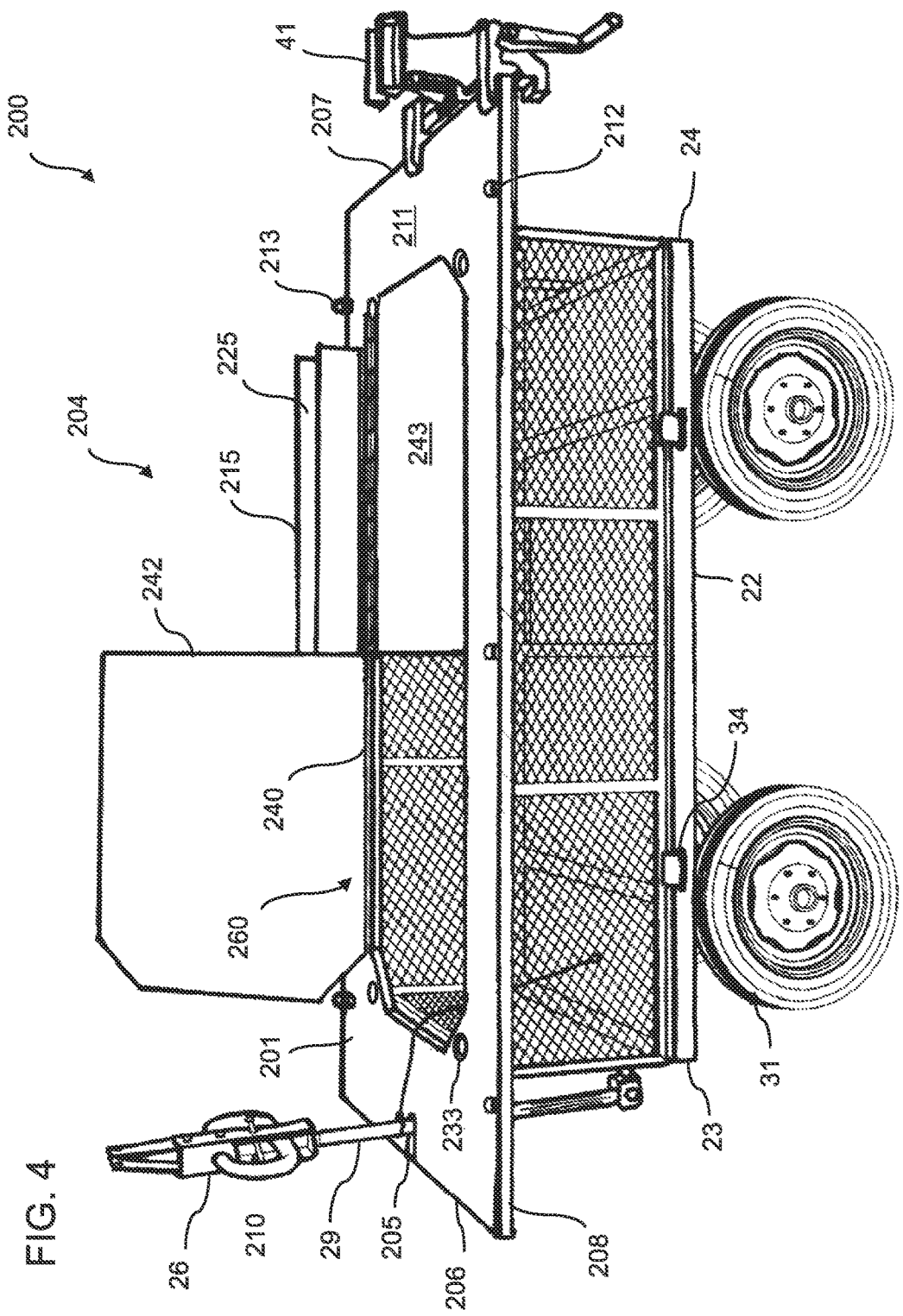
FIG. 4 is a side-elevated perspective view of the mobile workstation system of FIG. 1 showing the work platform in an open configuration.
Figure 5:
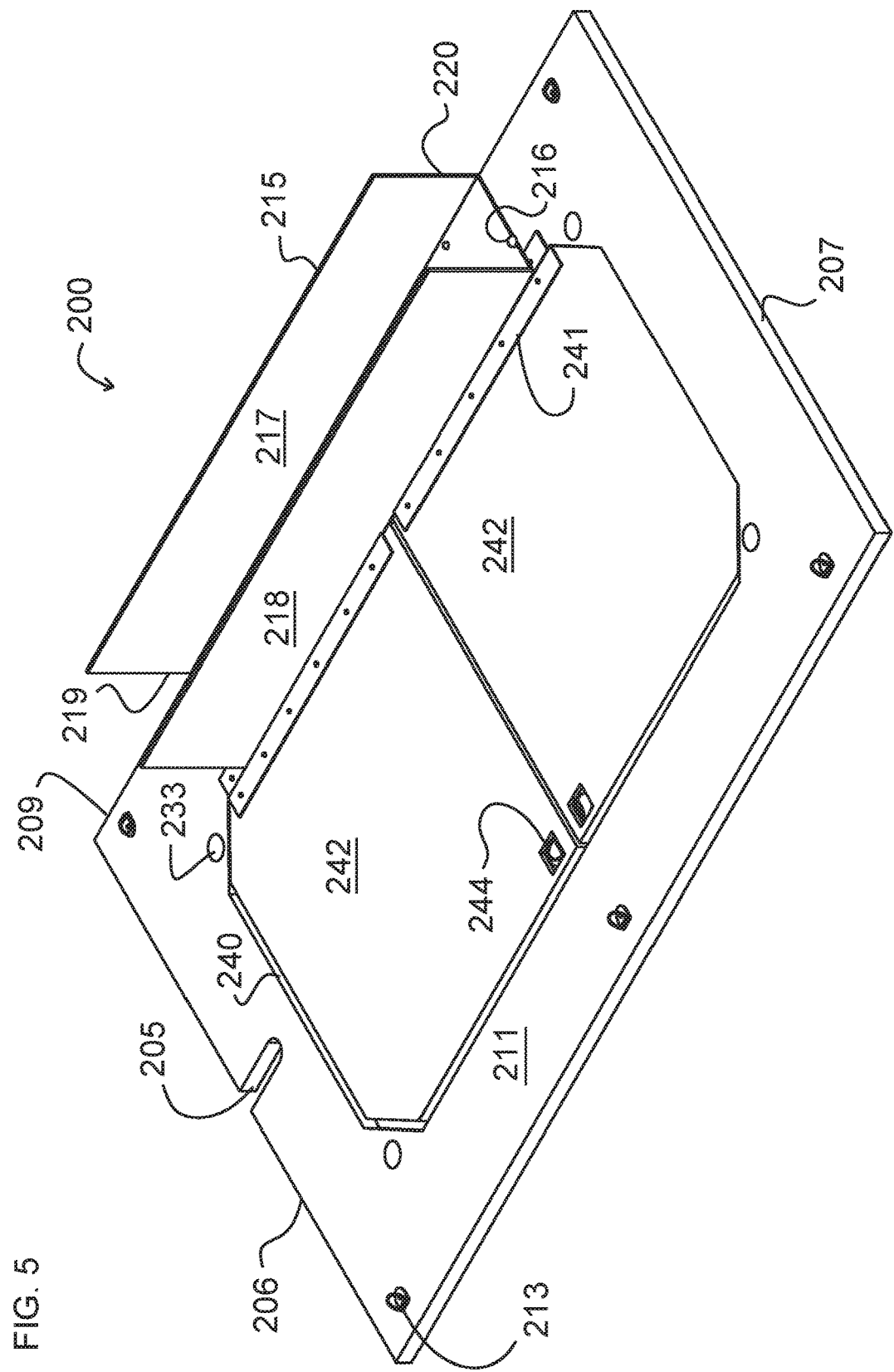
FIG. 5 is a rear, left-side, elevated perspective view of one embodiment of the work platform of the present invention.
Figure 5B:
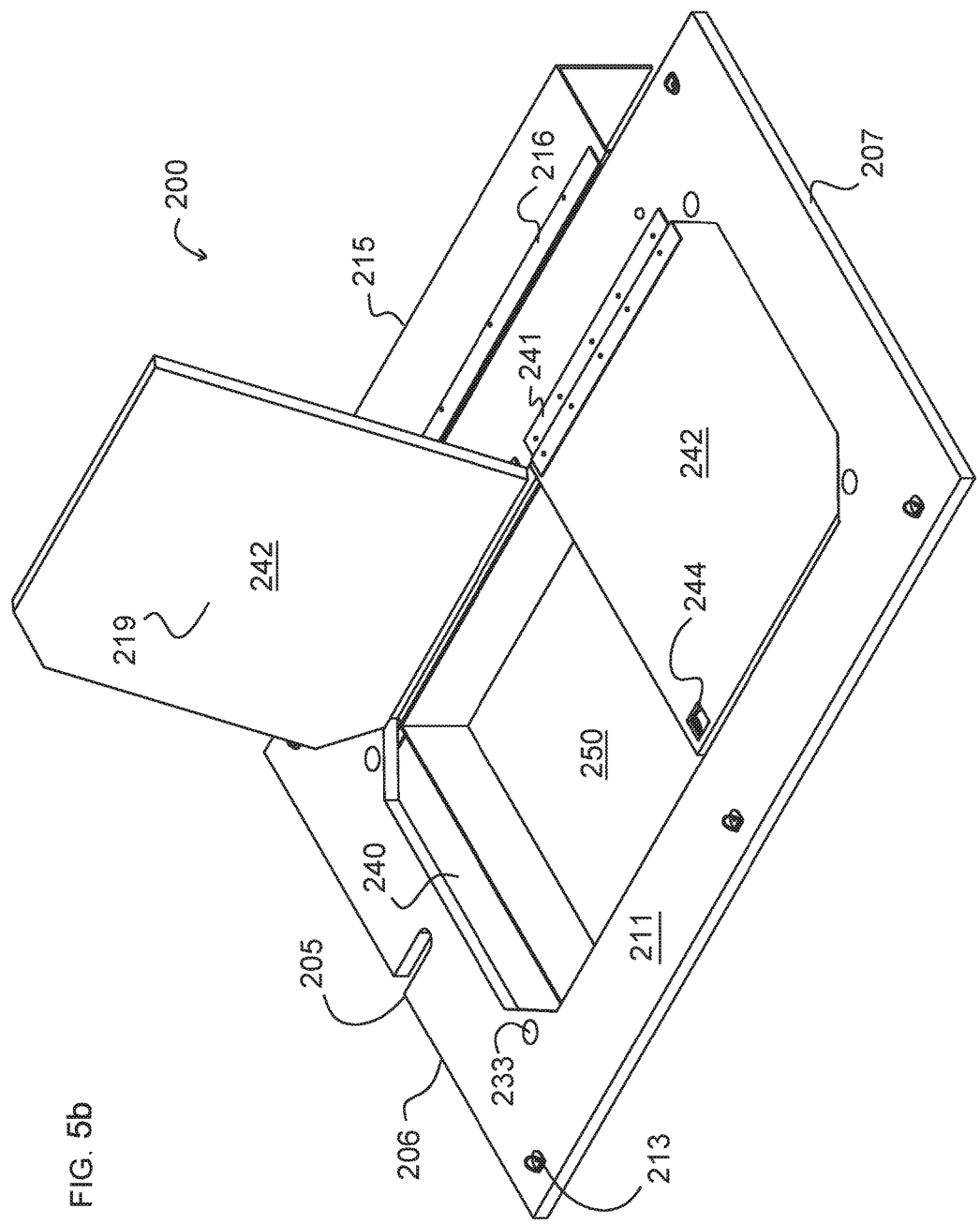
FIG. 5b illustrates the work platform of FIG. 5 having an open basket configuration.
Figure 6:
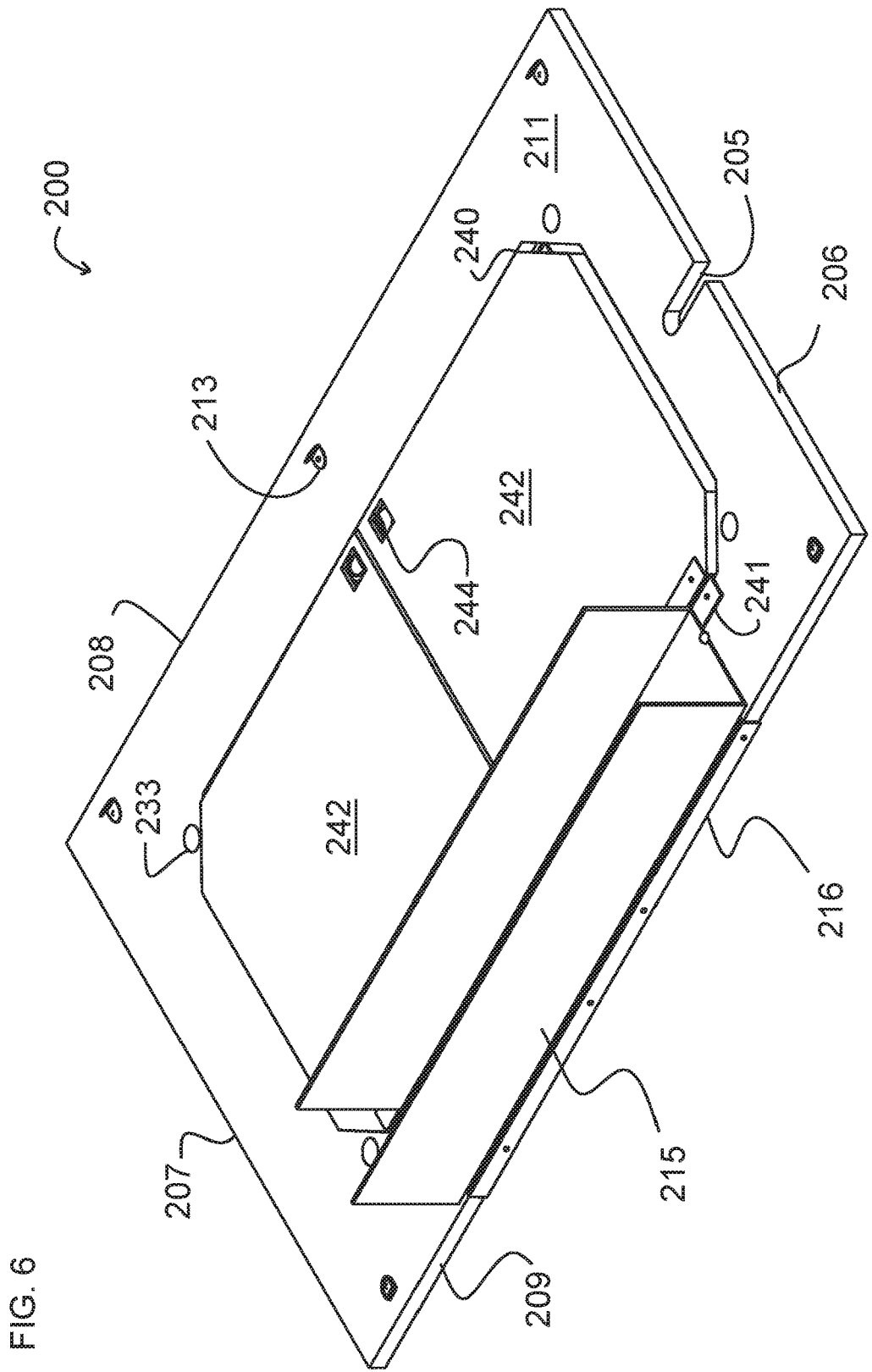
FIG. 6 is a front, right-side, elevated perspective view of the work platform of FIG. 5.

FIG. 4 illustrates an access configuration of the work platform 200 of FIGS. 1-3. Similar configurations are also illustrated in FIGS. 5b, 6b, 10-10b, 11, and 14-18 for the work platforms of those associated embodiments. This configuration facilitates access through the hatch 240 to the internal basket space 260 otherwise enclosed by the lids 242 of the work platform 200 and sidewalls 21 of the bucket cart 20.

A first lid hinge 241 facilitates the independent rotating of the first deck lid 242 with respect to the second deck lid 242 to provide access to the hatch 240. A second lid hinge 241 facilitates the independent rotating of the second deck lid 242 with respect to the first deck lid 242 and the work platform to provide access to the hatch 240 and basket space 260.

The basket space 260 accessed via the hatch 240 will necessarily have a size determined by the size of the side walls 21 of the cart 20 employed. In this case, the basket space 260 has inner walls measuring about 22 inches wide by about 44 inches long by about 14 inches deep. This enables the present inventive system to facilitate carrying medium sized tools and gadgets in an organized fashion. Specifically, the medium sized tools are separated from the larger sized tools which were secured on the upper surface 201 of the work platform 200 while the mobile workstation system is in the transportation configuration 101 or in the working configuration 102.

Towards the front end 206 of the work platform 200, the shaft 29 of the handle 26 is releasably retained by a tool attachment system 212. Specifically, an elastic bungee cord 214 is secured at a first end to the frame 22 of the bucket wagon 20 and secured at a second end to the shaft 29 of the handle 26.

For Use with Either Bucket Cart 20 and/or Flat-Bed Cart 30

It is to be appreciated that while the bucket cart 20 is shown as placed frontward, and the flat-bed cart 30 is placed rearward, these positions may be reversed without departing from the spirit of the invention so long as the cart connector 300 is installed on the rear axle 27 of the forward placed cart 30, 20.

For example, in FIGS. 1-4, the towing apparatus 10 is pulling a bucket cart 20, i.e., a cart having upwardly extending sidewalls 21. These sidewalls 21 extend upwards from a frame 22 with a frame front end 23 and a frame rear end 24. The front end 23 of the frame 22, also referred to as the first end 22, is associated with a first axle 25 from which a handle 26 extends. The rear end 24 is associated with a second axle 27, also referred to as the rear axle 27, from which the cart connector 300 is connected as discussed in this specification elsewhere.

The cart connector 300 is shown disposed and installed on the first trailer cart 20, thereby pulling the second trailer cart 30. Due to the nature of the desired use, the cart caddy 400 employed upon the second trailer cart 30 is one which works with flat-bed cart 30 having a continual surface, i.e., no upwardly extending sidewalls, only a flat upper surface 35.

In another embodiment however, the towing apparatus 10 initially pulls a flat-bed cart 30, having no upwardly extending sidewalls, and the cart caddy 400 thereupon. The cart connector 300 is connected to the second axle 27 of this flat-bed cart 30. The cart connector 300 thereby connects the flat trailer cart 30 to the handle of a bucket cart 20 having upward extending sidewalls, which preferably supports the work platform 200.

Having now discussed an embodiment of the present invention in a manner of potential use in broader terms and the interaction of various subsystems 200, 300, 400, focus is now directed towards detailed aspects of these same subsystems 200, 300, 400 of mobile workstation system 100.

Work Platform 200

Whether measuring materials, joining different pieces together, or finishing a project, a work platform is ideal for working safely, accurately and correctly. A clean and level work platform is preferred for precisely measuring, cutting, and finishing wood. A work platform is also a necessary workspace for drafting, coming up with creative ideas, and enabling inspiration. Essentially, a clean, sturdy and level work platform is a necessity for all efficient, reliable, and careful workers. Call it a workbench, working area, working table or a working counter, the work platform is where almost all the work is concentrated. Unfortunately, many wagon carts of the present day have a frame 22 which is at least partially formed of metal grating in order to decrease costs while maintaining structural integrity. However, the metal grating makes it difficult to use these wagons for anything other than transportation. FIGS. 1, 3-6 illustrate a work platform 200 according to the present invention which provides these metal frame wagons 20, 30 with an upper surface 201, a smooth planar flat working deck surface of uniform consistency.

Each of the lids 242 for the hatch 240 has an upward surface 243 which is aligned with and forms a horizontally-interrupted and vertically-invariable part of this upper working surface 201. Surrounding each of the lids 242, a peripheral portion 211 of the work platform 200 extends outwardly, such that at each end of the work platform 200, there remains an uncommitted upwards working area that could be used for other owner needs. For example, for a work platform of thirty by sixty inches, an eight-inch perimeter portion 211 might extend about the upper flat surface of the lids 242. For those carts 20, 30 which engage the work platform along an underside portion adjacent the hatch 240, this peripheral portion 211 might correspond with an overhanging portion of the work platform 200.

For example, in FIGS. 1-4, at each end 210, there is an 8 inch by 30 inch overhanging portion 211, on which a vice 41 can be mounted. Although not shown, additional holes may also be provided along such an overhanging portion 211 for providing retaining apertures capable of supporting and transporting hand-held tools such as trowels and screw drivers.

The Tool Holster 215

Shown in FIGS. 1-4 is a tool holster attached to the work platform 200. This tool holster acts as a tool holder for those tools having longer handles such as rakes, shovels, etc. This tool holster 215 may be surface mounted on either of the caddy deck 400 or the work platform 200 to carry long handled tools such as rakes and shovels.

In FIGS. 1-9, the tool holster 215 is a manufactured sheet metal tray. Preferably, having dimensions of about 40" long×3" deep×3" wide. In the embodiment in FIGS. 1-9, holster 215 is shown as a U-channel having three parallel segments, two of which extend outwardly perpendicular from the central segment connecting the sidewall segments. In other embodiments, holster 215 may be shaped differently to accommodate different tasks or attached to platform at a parallel segment. In the embodiment in FIGS. 1-9, holster 215 is shown as a single continuous piece of metal. In other embodiments, holster 215 may be constructed of rigid or semi-rigid materials, be crafted from multiple parts, have multiple segments dispersed on platform 200, and have multiple channels.

In the embodiment in FIGS. 1-4, holster 215 is shown as non-destructively removably attached to platform 110 via fasteners 216. Two steel pins 216, with flat heads are used to secure the tool holster 215 to the work platform 200 for quick release. These steel pins may be about 1½ inch by about ⅜ inch with flat heads. In other embodiments, holster 215 may be attached permanently via welding. However in embodiments in which the holster 215 is permanently attached, the usable space of the upper surface 201 of the work platform 200 is reduced.

In the embodiment in FIGS. 5-9, fasteners 228 and a hinge 229 rotatably connect the holster sidewall 215 to the platform 200. The two pins 216 are located at either end of the holster and are capable of pivoting on a non-centrally located axle. When the pins 216 are pivoted inwards, the holster is captively retained on the front and rear by the pins, and along the side by the hinge 229. When the pins 216 are pivoted outwardly away from front 219 and rear 220 of the holster 215, the holster 215 is released from the pins 216 and then capable of rotating from the top of the platform 200 to the side of the platform 200, increasing the available workspace along the upper surface 201 of the platform 200.

Railing System 230

The railing system 230 involves a plurality of apertures 233 placed about a perimeter of the platform 200 or the caddy deck 400. In the embodiment shown in FIGS. 1-9, this plurality of apertures 233 has four holes 233 placed along the external periphery of the hatch 240 in the work platform 200. The apertures have a diameter which is slightly larger than a diameter of a plurality of stakes provided for inserting and supporting thereby. Stakes or stanchions 230, i.e., upright bars, posts or frames forming support or barrier, are preferably about 12 to 50 inches long, and more preferably, are about 36 inches long. These stakes 230 can serve as upward boundaries for carrying long material and permit the carrying of a quantity of pipe or lumber up of about eight feet in length.

In one embodiment, these stakes 230 are four electrical conduit pipes having a length of about 30 inches and a diameter of about ½ inches. The corresponding apertures 233 have a diameter of about ⅝ inches. In this embodiment, two wood base mounting strips 232 are also provided to anchor the four stakes 230 between the platform 200 and the cart frame 22. These mounting strips 232 are secured by three screws and washers to the cart body frame 22.

Figure 8:
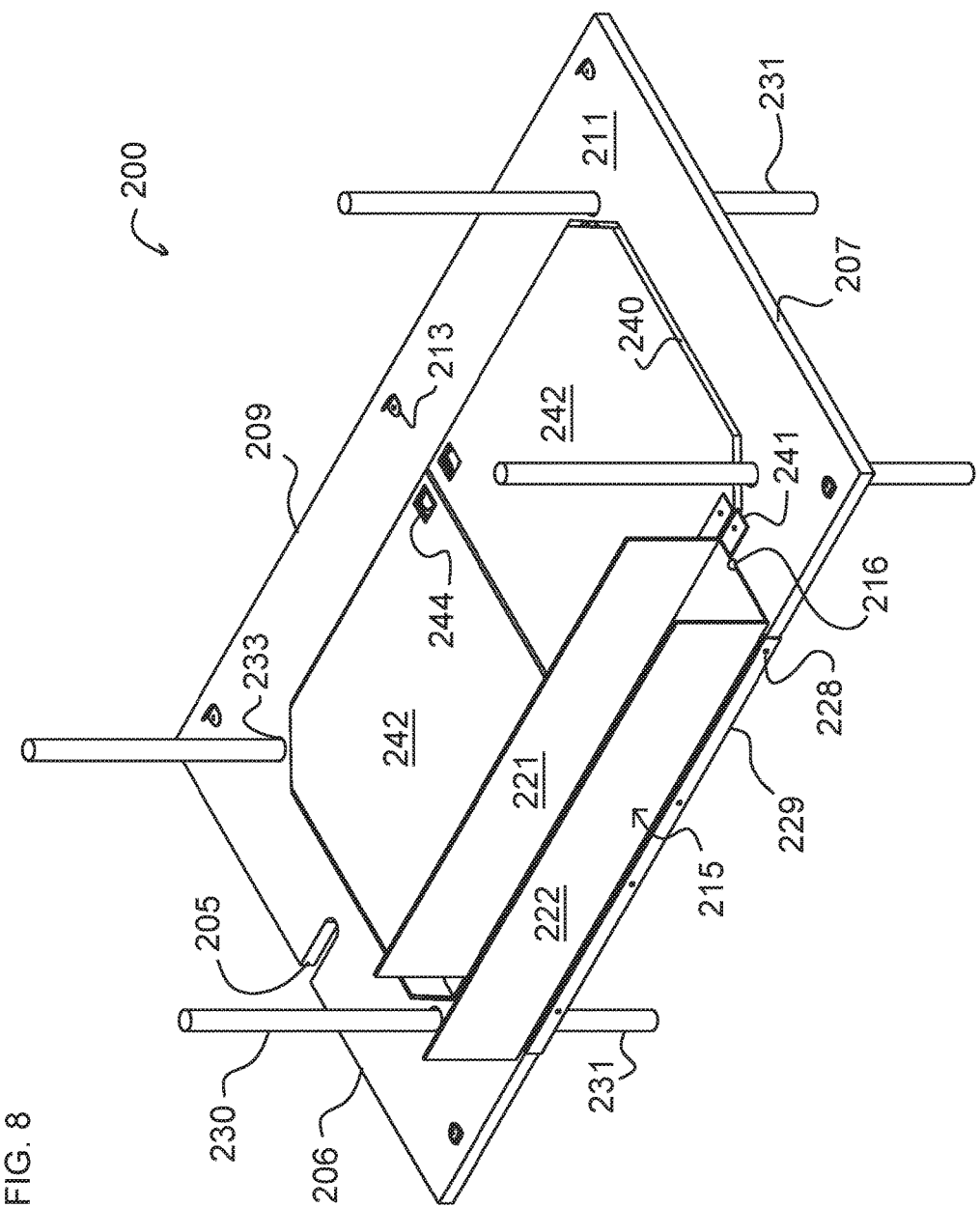
FIG. 8 is a rear, left-side, elevated perspective view of one embodiment of the work platform and railing system of the present invention.
Figure 9:
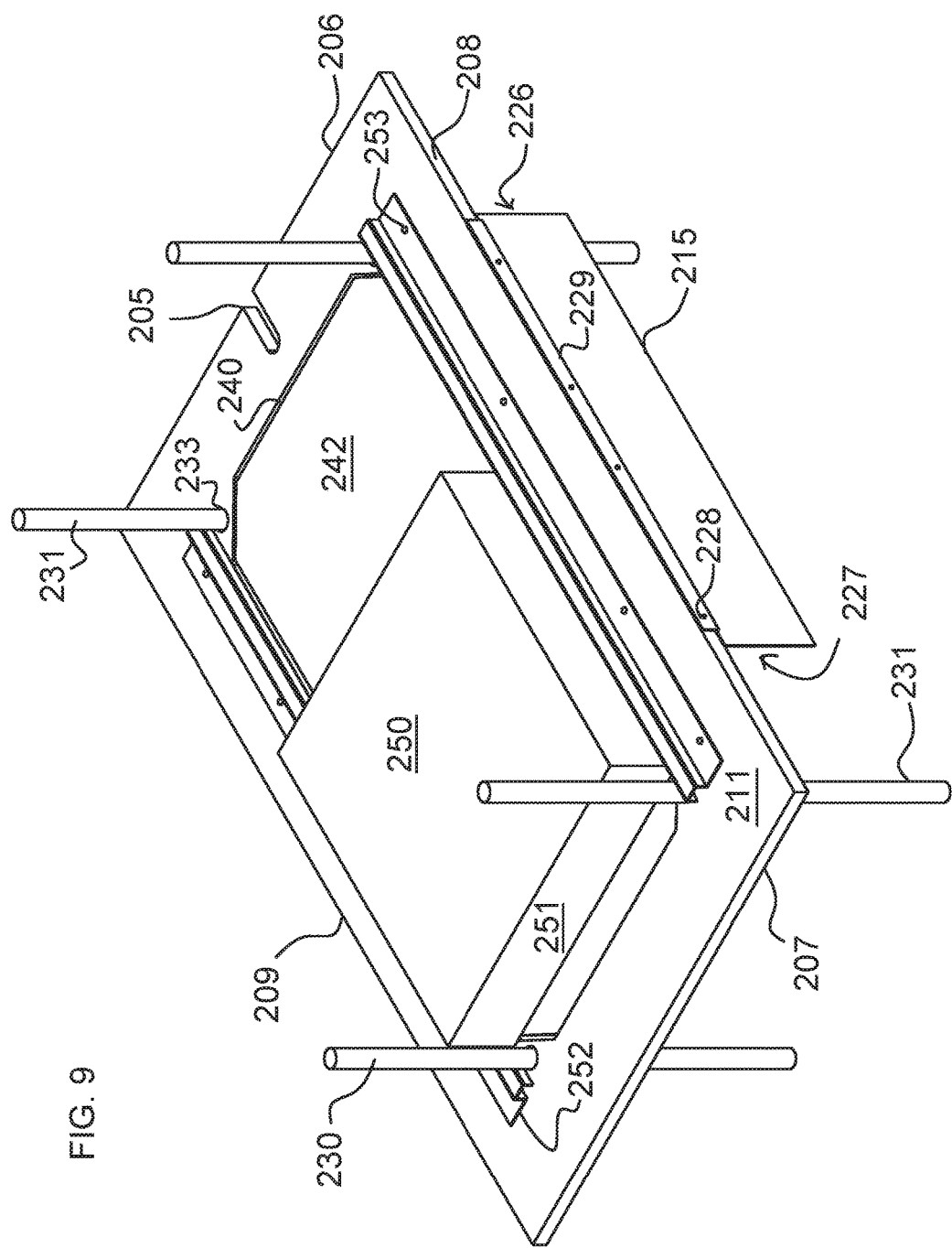
FIG. 9 is a bottom view of the work platform of FIG. 8.

In the embodiment of FIGS. 8-9, the stakes 230 pass through apertures 233 of the platform 200 and rest within the bucket space 260 of the trailer cart 20 on frame 22. In this embodiment, stakes 230 are ½" electrical conduit cut into 30" lengths. Other embodiments may use rigid, semi-rigid, or flexible material. Rigid or semi-rigid material such as metal, wood, or plastic may be used to provide open-air stacking space. Flexible or semi-flexible material such as cloth, nylon, twist ties, rubber, or rope may be used to tether equipment and/or materials to work platform 200.

In the embodiment of FIGS. 10-11 and 14-18, a compartment 251 within the small tool drawer 250 is provided for storing the stakes 230 of the railing system when not in use. As shown in these drawings, the stakes 230 are accessible through the hatch 240 when the lid 242 is raised.

Adjustable Support System 270

Figure 10:
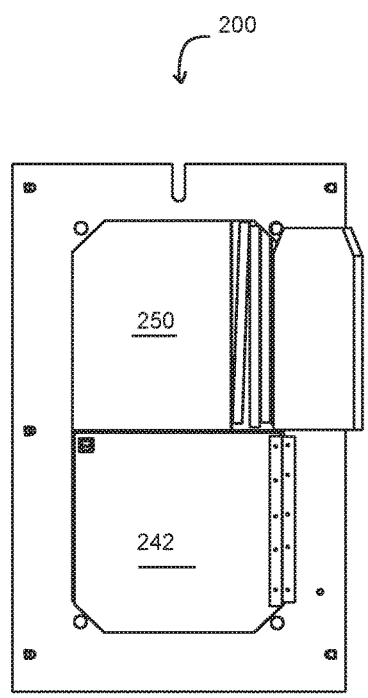
FIG. 10 is a top view of one embodiment of the work platform of the present invention in an open configuration.
Figure 10A:
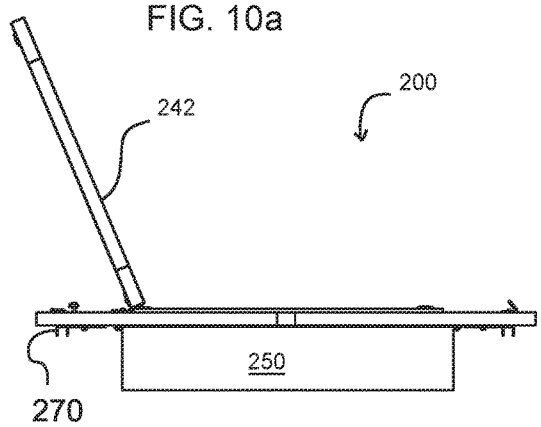
FIG. 10a is a front view of the work platform of FIG. 10.
Figure 10B:
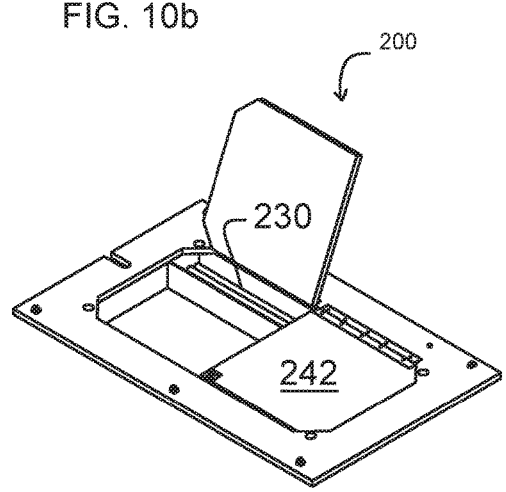
FIG. 10b is a rear, left-side, elevated perspective view of the work platform of FIG. 10.
Figure 10C:
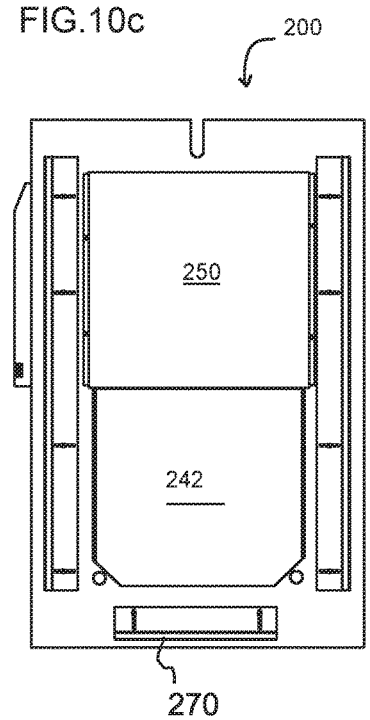
FIG. 10c is a bottom view of the work platform of FIG. 10.
Figure 11:
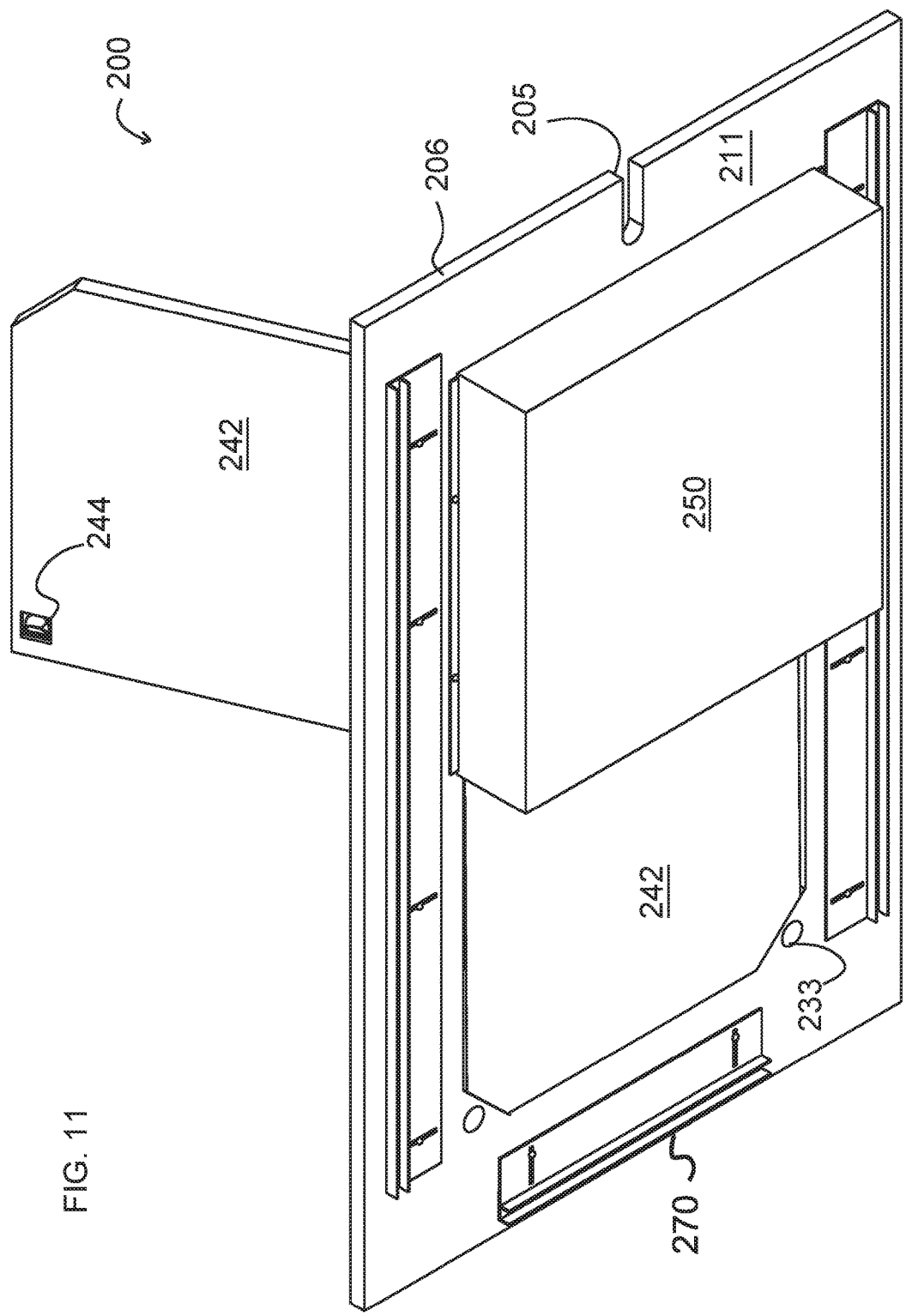
FIG. 11 is a bottom, front, right-side, elevated perspective view of the work platform of FIG. 10.

FIGS. 10-11 illustrate various views of another embodiment of the work platform of the present invention in an open configuration. Along with the compartment 251, this embodiment also has an adjustable support system 270 for releasably securing the work platform 200 to the sides of the bucket trailer cart 20. The adjustable support system 270 shown in this embodiment has three adjustable supports adjustably secured to the bottom of the work platform along the right, left and rear portions, see FIGS. 10a,10c, 11. Each adjustable support is an F-channel with elongated apertures perpendicular to the channel length. Pins extend through these elongated apertures and enable these supports to adjustably support the work platform on bucket sides of different sizes.

For example, if the bucket shape of the wagon cart 20 was wider, a user would loosen the pins, slide the side adjustable supports toward the outer edges of the work platform 200, and then tighten the pins at the correct width. Alternatively, if the bucket shape of the wagon cart 20 was narrower, a user would loosen the pins, slide the side adjustable supports away from the outer edges of the work platform 200, and then tighten the pins at the correct width. Similar adjustments can be made for wagon carts 20 having different lengths by adjusting the position of the support along the rear.

Caddy Deck 400

Figure 12:
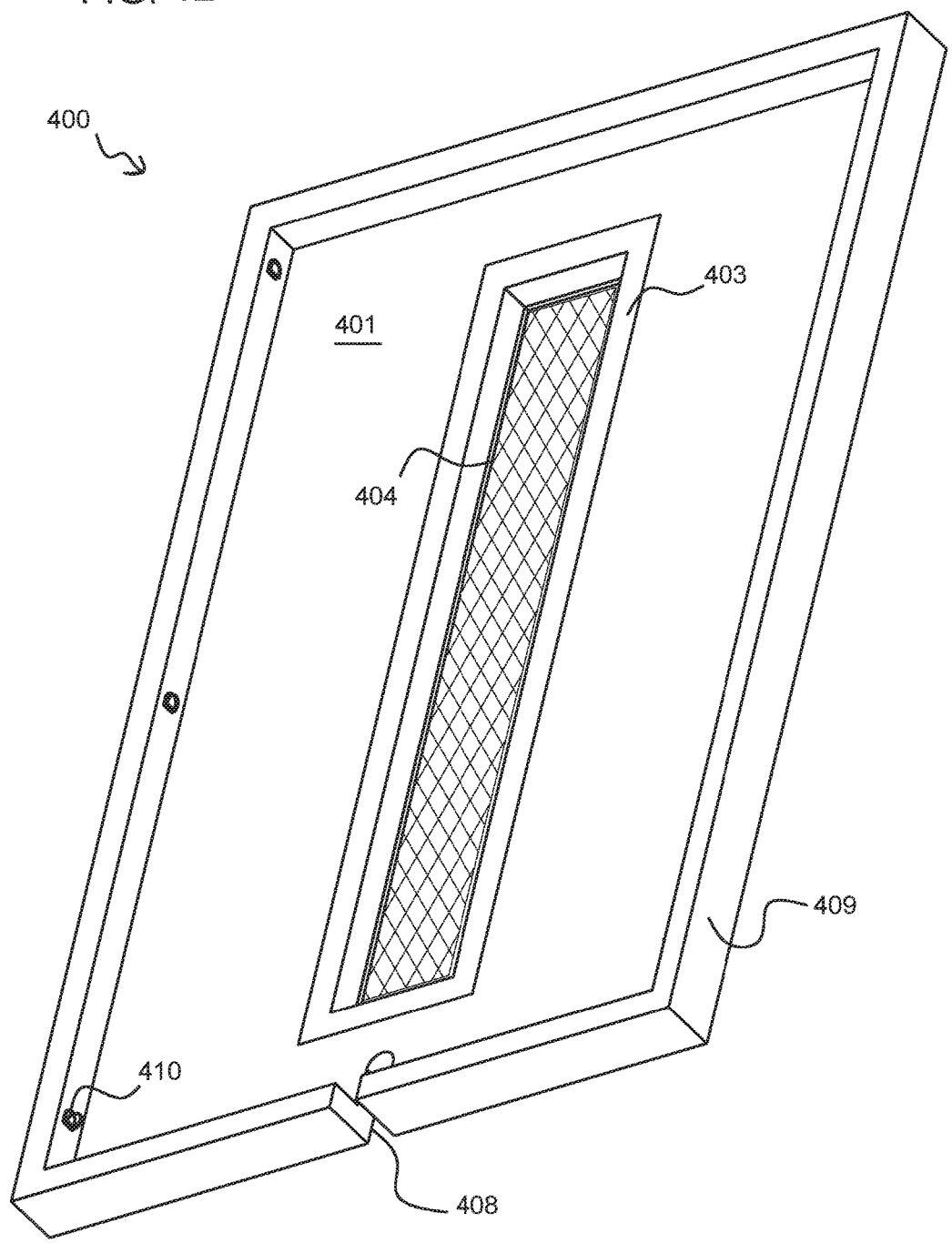
FIG. 12 is a top, front, left-side, elevated perspective view of the caddy deck of one embodiment of the present invention.

The caddy deck 400 is designed to be employed for flat-bed carts 30. The embodiment shown in FIGS. 12-13 has an upper surface 401 of deck space of about 30×20 inches. The deck main body 411 is about half an inch thick with upward extending ribs 409 of about one inch thick. A dress-up metal frame and support 403 encompasses the perimeter of metal mesh drainage grated aperture 404 having a width and length of about 10×45 inch. The grated aperture 404 allows increased airflow which otherwise would cause heat build up for several of the electronic generators models on the market today.

Fasteners 410 are positioned along the perimeter upward rims 409 for releasably retaining equipment during transportation. In the embodiment shown in FIGS. 1-4, fasteners are placed directly on the upward facing surface 401 of the caddy deck. The slot 408 is positioned facing the front of the cart 30 so as to hold the handle shaft firmly in place when in a working or stationary position without getting in the way of the workers along the ground surface.

Figure 13:
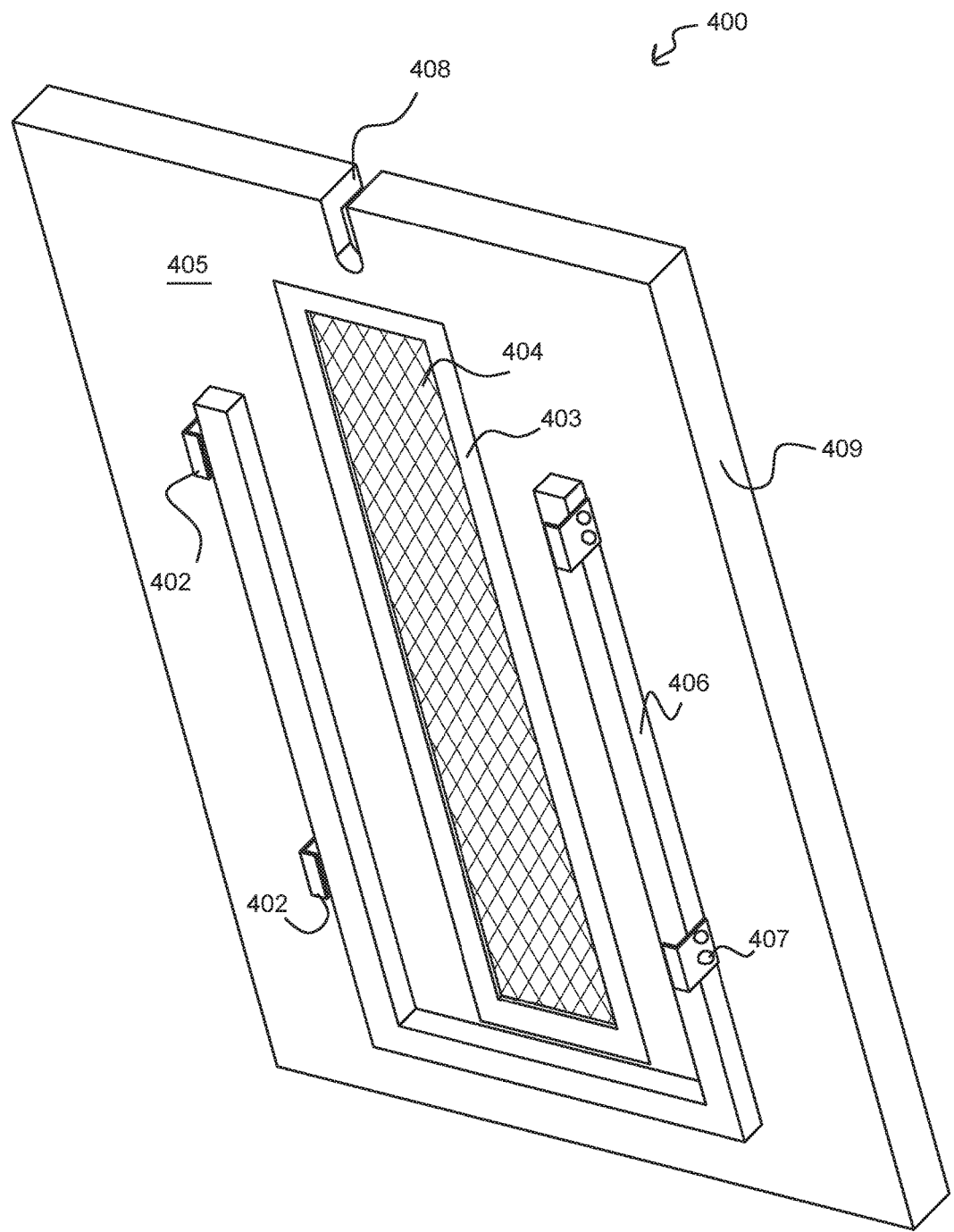
FIG. 13 is a bottom view of the caddy deck of FIG. 12.

As shown in FIG. 13, the underside 405 of the caddy deck has one-inch thick ribs 406 for structural strength. A plurality of specially designed metal brackets 402 are provided to utilize the slots, found on the cart bed frame originally to secure side walls to the cart bed frame, to secure the caddy deck to the cart frame. The number of brackets may vary, preferably there may be as many as twelve or as few as four, and more preferably eight in total. Generally, screws 407 are used to secure the metal brackets 402 to the thick ribs 406. However, in another embodiment, these brackets may also be secured with quick release pins which enable the releasable engagement of the caddy deck with a first or second cart 30 if desired.

Hybrid Deck 500

Figure 14:
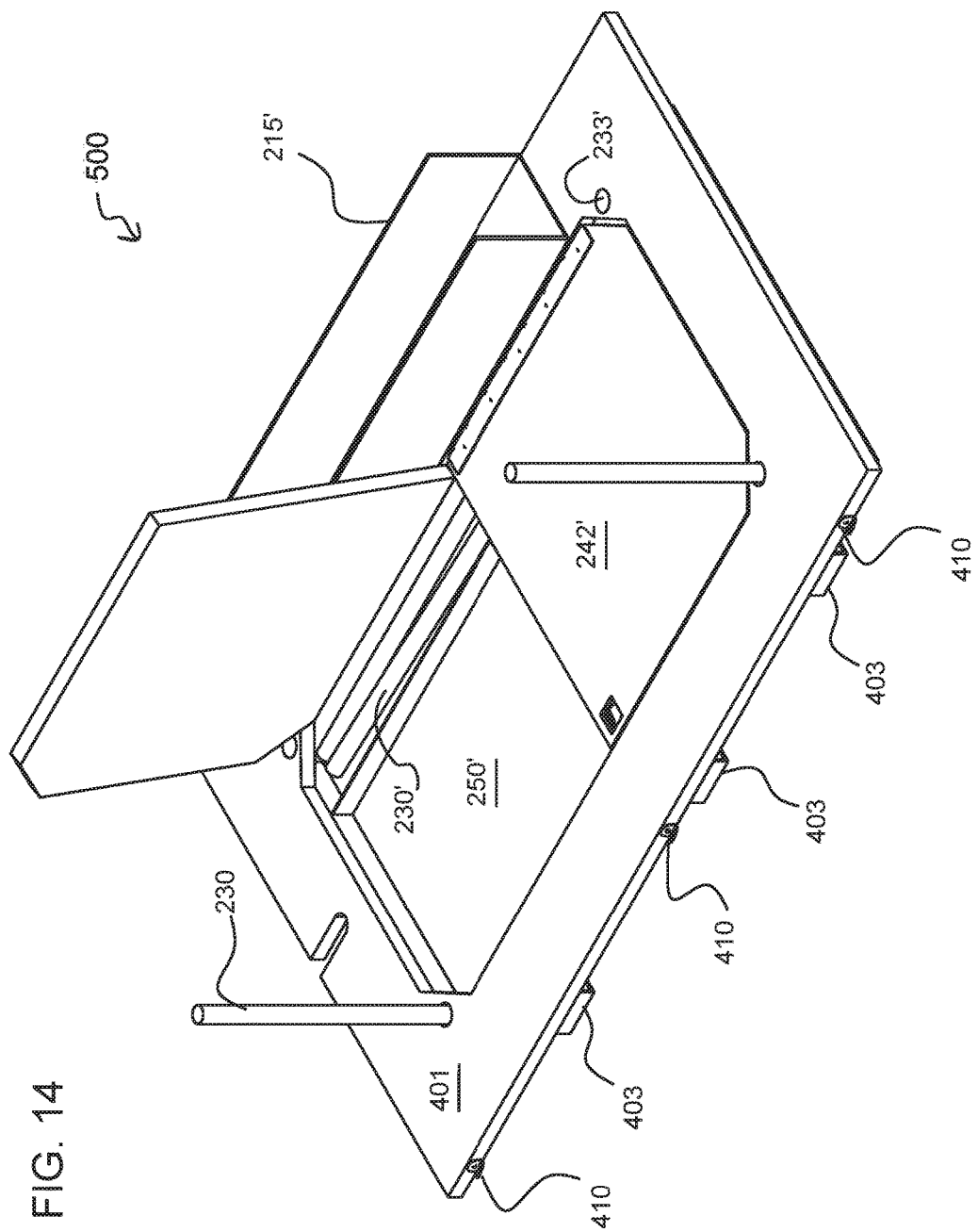
FIG. 14 is a top, rear, left-side, elevated perspective view of the hybrid deck of another embodiment of the present invention.

Turning next to FIGS. 14-18, are illustrations of various views of a hybrid work platform/caddy deck 500 according to another embodiment of the present invention. FIG. 14 is a top, rear, left-side, elevated perspective view of this hybrid deck 400. FIG. 15 is a top view, FIG. 16 is a right-side view, FIG. 17 is a rear view, and FIG. 18 is a top, rear, left-side, elevated perspective view of this hybrid deck 400.

As shown here, this hybrid deck 500 has features from both the caddy deck 400 and the work platform 200 but by placing the fasteners along the outer edges, the work platform 200' of this hybrid deck has increased tool carrying capabilities while in the working configuration. However, unlike the work platform 200 described above, the support ribs 406 and brackets 402 mean that this hybrid deck 500 is best employed with a flat bed wagon cart 30.

Cart Connector 300

Figure 19:
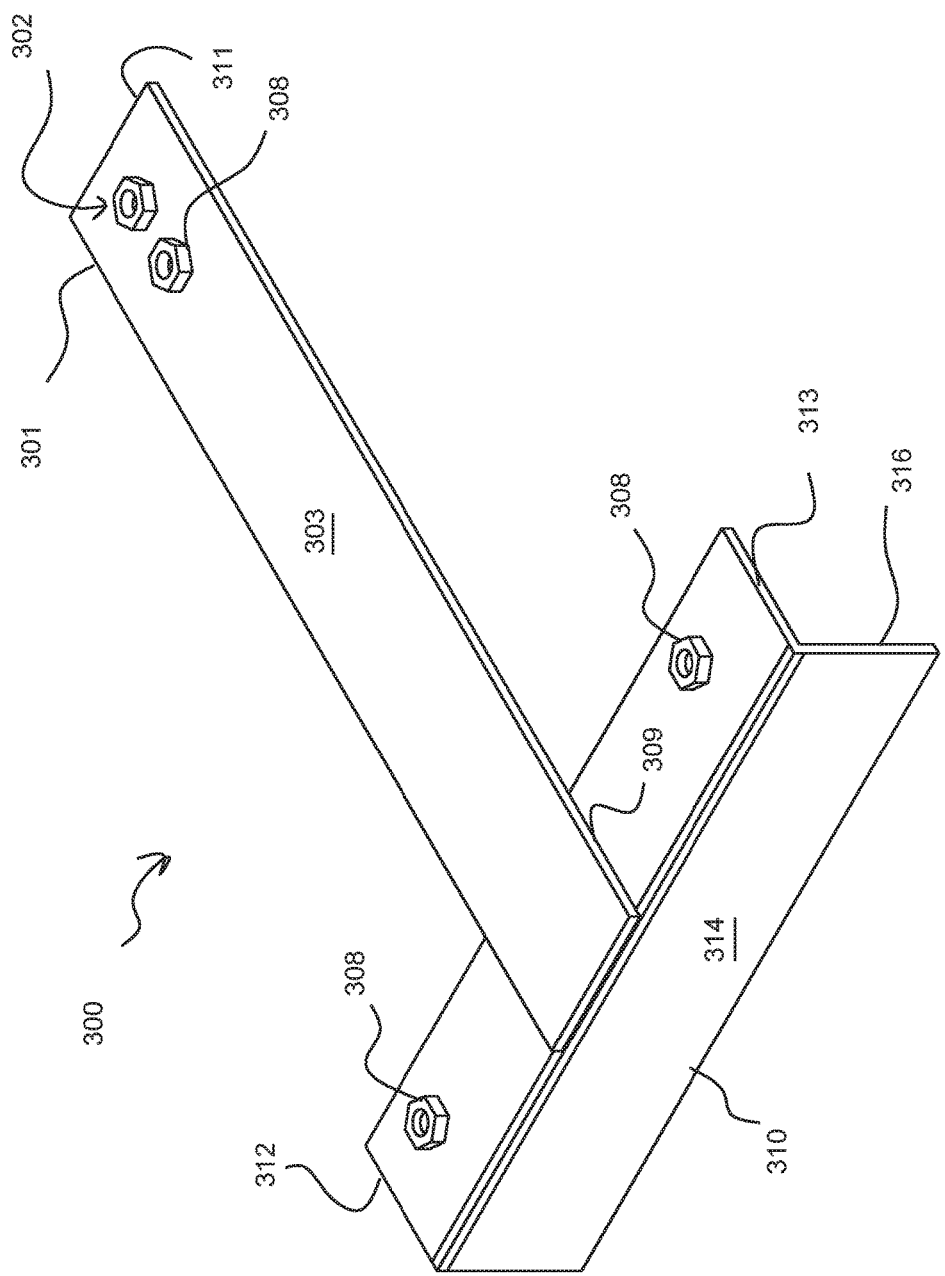
FIG. 19 is a front, top, left-side elevated perspective view of one embodiment a cart connector of the present invention.
Figure 20:
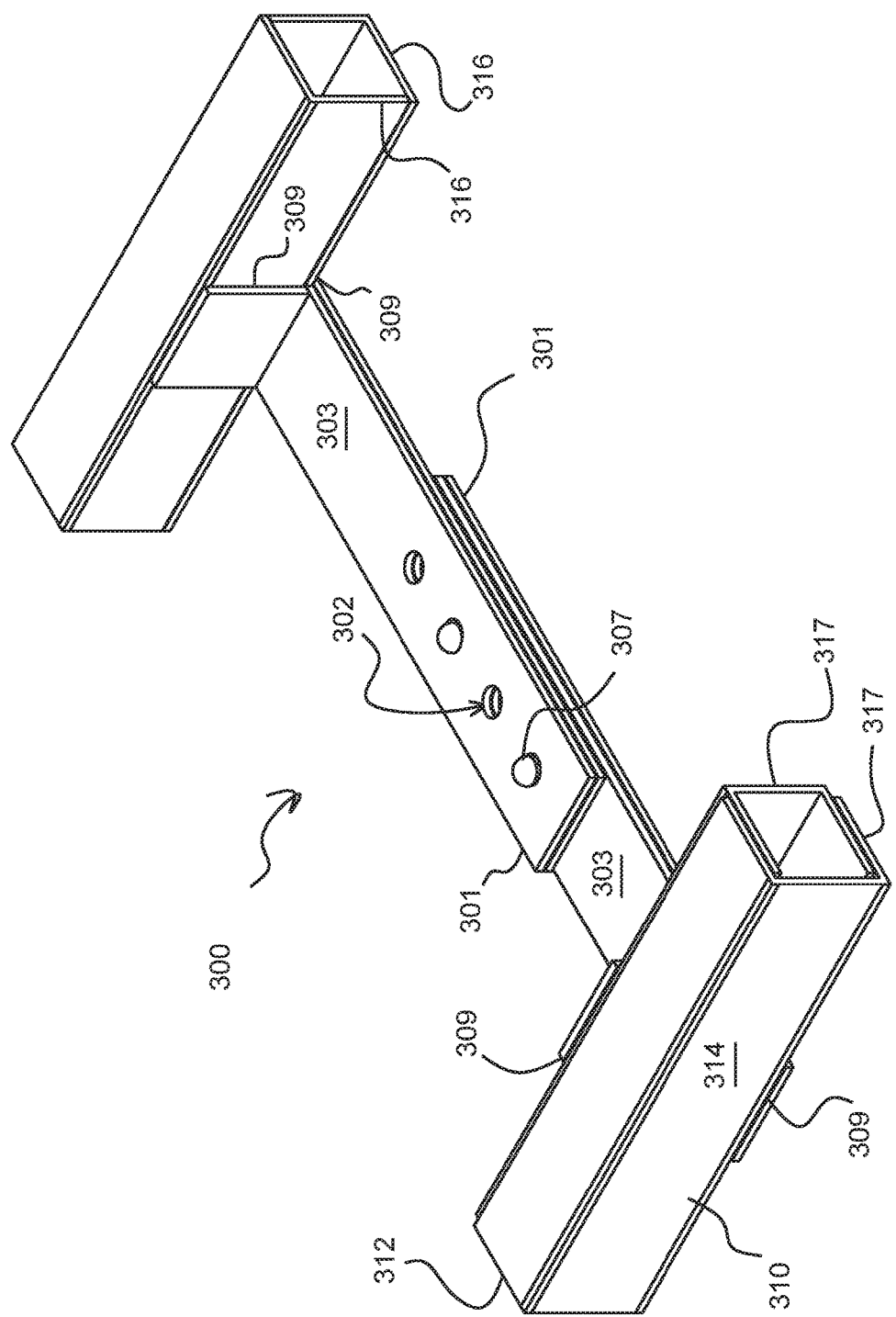
FIG. 20 is a front, top, left-side elevated perspective view of one embodiment a cart connector of the present invention.
Figure 21:
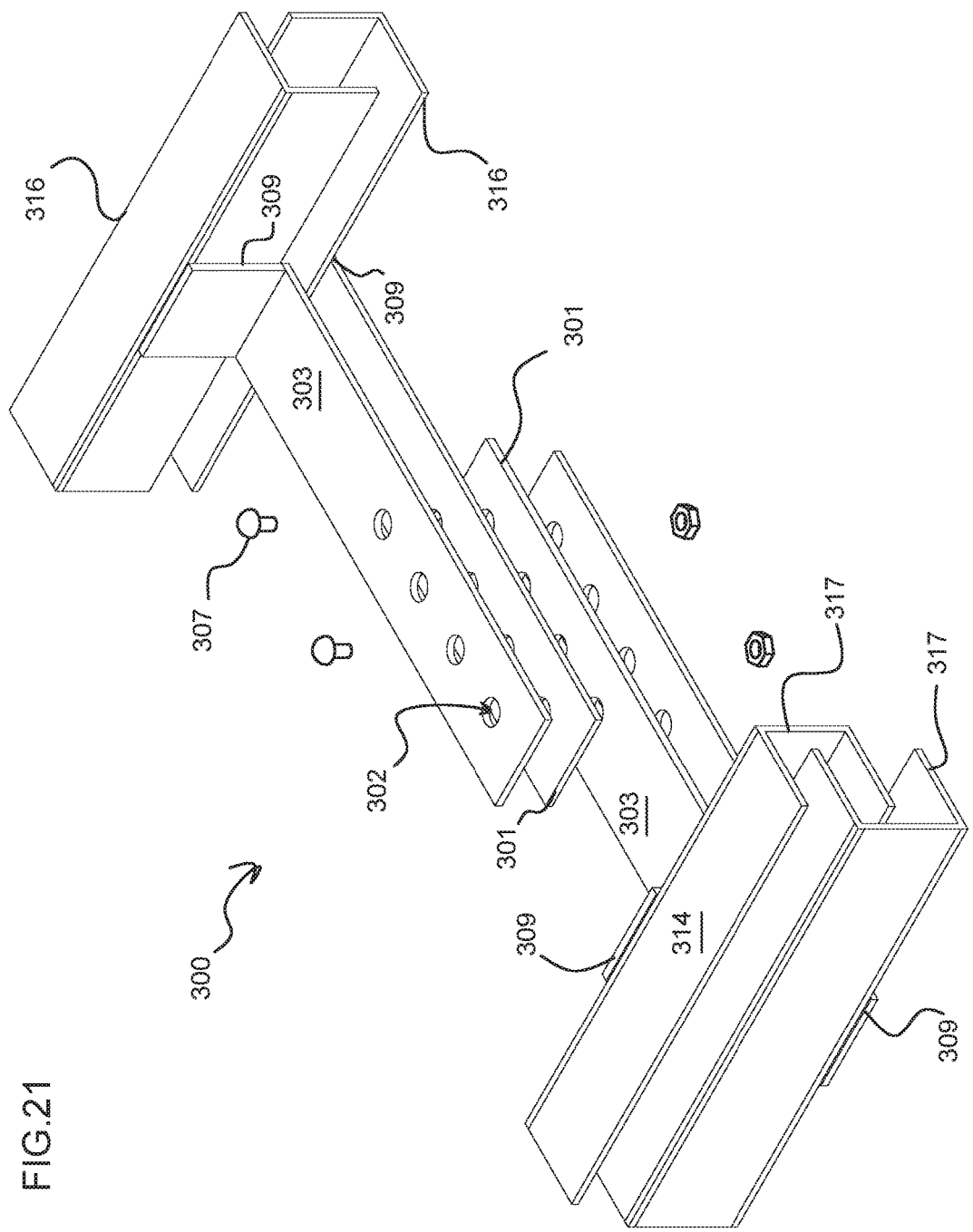
FIG. 21 is an exploded view of the cart connector of FIG. 20.

FIG. 19-21 show embodiments of a cart connector 300 having a first axle bracket 310 with a weld connection 309 to an extension shaft 303. FIG. 19 is an example of a cart connector 300 having a first axle bracket 310 in the form of an L-shaped bracket 316 as that employed in FIGS. 1-4.

Briefly referring back to FIGS. 1-4, note that the first axle bracket 310 acts as a first cart connection portion of the cart connector 300. The L-shaped bracket 316 enables this first cart connection portion capable of releasably engaging a frame portion of the first cart. As the embodiment in FIGS. 1-4 deals with a convertible handle, a second cart connection portion needs merely to be capable of releasably engaging the outward arms of the handle 26. The second cart connection portion in that embodiment then employs a standard flat bracket having an extension shaft extending between the first cart connection portion and end of the flat bracket with connecting aperture(s) 302.

Due to the interrelated nature of this connector, various configurations of the cart connector 300 are possible, and these configurations are illustrated in FIGS. 2, 3, and 12-13. In the attached configuration 304 as shown in FIG. 2, the cart connector 300 engages a frame portion of the first and second carts, namely, the axle of the first cart and the handle of the second cart. In the detached configuration 305 as shown in FIG. 3, the cart connector 300 engages only a frame portion of the first cart, namely, the axle of the first cart.

FIGS. 19-21 illustrate yet a third disconnected configuration 306 in which the cart connector 300 is completely disconnected from either the first leading cart 30 or the second trailing cart 20. In this disconnected configuration 306, the cart connector 300 may be easily stored within the small tool drawer 250 or hatch basket space 260 of the cart 30, 20.

Note that in these various configurations of the cart connector 300 as illustrated in FIGS. 2, 3, and 19-21, different features are visible. For example, in the attached configuration 304 as shown in FIG. 2, the quick release pin 307 extends through an aperture of the convertible handle. In the detached configuration 305 as shown in FIG. 3, the connecting aperture 302 is visible along the extension connecting end 301 of the extension shaft 303. In the third disconnected configuration 306 shown in FIGS. 12-13, the fasteners 307, 308 which connect with the flat bracket portions along the shaft are visible as before, but also visible now are the fasteners 308 which connect with the L-shaped and U-shaped brackets.

In its simplest form, the cart connector 300 may have releasable nut & bolt connections 308 for attachment to either the first leading cart 30, 20 or the second trailing cart 30, 20. A weld connection 309 may be employed to connect the first axle bracket 310 to the shaft 303 along an upper weight load bearing surface or they may be molded integrally. The first axle bracket 310 is generally going to be affixed or otherwise connected to a forward leading cart 20,30 such that the front 314 faces the front of the cart, the rear 311 faces the rear of the cart, the left side 313 faces the left of the cart, and the right side 312 faces the right of the cart.

Note that not every cart will come with a handle 26 which is reversible, as shown in FIG. 2, however most wagon carts do come equipped with a handle 26 of a standard form. To address this, the embodiment shown in FIGS. 20-21 illustrate a cart connector 300 capable of reversibly interacting with a standard handle 26. This cart connector 300 has a first U-shaped bracket 317 welded to a first shaft/flat bracket 303, a second U-shaped bracket 317 welded to a second shaft/flat bracket 303, a first L-shaped bracket 316 welded to a third shaft 303, and a second L-shaped bracket 316 welded to a fourth shaft 303. The first U-shaped bracket 317 and the second U-shaped bracket 317 face one another forming a channel through which a handle might extend. Alternatively, in the reversed position, the first L-shaped bracket 316 and the second L-shaped bracket 316 also face one another, and also form a channel through which a handle might extend.

As before, quick release pins 307 extend through at least two connecting apertures 302. By providing a plurality of apertures as shown here, the length along the extension shafts between the axle bracket 310 and the handle bracket 315 may be increased or decreased as desired. In this embodiment the axle bracket 310 is formed by the first U-shaped bracket 317 welded to a first shaft bracket 303 and a second U-shaped bracket 317 welded to a second shaft bracket 303. The handle bracket 315 is formed by the interaction of a first L-shaped bracket 316 welded to a first shaft bracket 303, and a second L-shaped bracket 316 welded to a fourth shaft bracket 303.

In another embodiment, the axle connector bracket 310 is formed by a single L-shaped bracket 316 welded to a first shaft 303, the axle connector bracket 310 being welded or otherwise affixed to the cart axle 27. Forming a handle connector bracket 315 is then done either by the interaction of a first U-shaped bracket 317 welded to a second shaft bracket 303 and a second U-shaped bracket 317 welded to a third shaft bracket 303 or a second L-shaped bracket 316 welded to a second shaft bracket 303, and a third L-shaped bracket 316 welded to a third shaft bracket 303. Regardless, each of these embodiments enable the cart connector to interact with various cart wagons 20, 30 with or without the presence of an adjustable handle 26.

CONCLUSION

Various terminology may be used to describe various embodiments of the present invention. Some of the equivalents are provided herein. The work platform may also be referred to as a deck, utility deck, workstation, or desk. Cart connector 300 may be referred to as a tandem tow double-sided connector, a two-sided hitch, or similar. The caddy deck may also be referred to as a platform, utility deck, workstation, or desk. Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A portable workstation system for use with a first utility wagon, having upwardly extending side rails, and a second utility wagon, having a convertible handle; the workstation system comprising:
    a work platform capable of being mounted upon one of the first and second utility wagons, the work platform having at least one lid capable of reversibly sealing and revealing a basket space accessible through a hatch within the work platform;
    a caddy deck capable of being mounted upon an other one of the first and second utility wagons, the caddy deck having a drainage aperture at one mouth of a wind tunnel created by interaction of the caddy deck and the other one of the first and second utility wagons; and
    a cart connector capable of releasably engaging a frame portion of the first utility wagon and a handle portion of the second utility wagon;
    wherein the workstation system being capable of transforming between a transportation configuration and a working configuration.

2. The portable workstation system according to claim 1, further comprising a tool holster releasably secured along an upwards surface of one of the work platform and the caddy deck.

3. The portable workstation system according to claim 1, wherein the caddy deck further comprising: upward extending ribs along a periphery of the caddy deck; fasteners capable of releasably securing and maintaining cords thereto; and supporting ribs along an underside of the caddy deck having a plurality of metal brackets spaced apart from one another.

4. The portable workstation system according to claim 1, further comprising a railing system of one of the work platform and the caddy deck, the railing system having:
    a plurality of apertures located about a perimeter of the one of the work platform and the caddy deck;
    a plurality of rails, corresponding to the plurality of apertures, each of the plurality of rails having a diameter less than a diameter of the plurality of apertures;
    a plurality of supports associated with each of the plurality of apertures located about the perimeter of the one of the work platform and the caddy deck, such that each of the plurality of rails is capable of being supported upwards when vertically extending through a respective one of the plurality of apertures when the workstation system is in the transportation configuration; and
    a compartment of the one of the work platform and the caddy deck, capable of storing the rails horizontally when the workstation system is in the working configuration.

5. The portable workstation system according to claim 1, further comprising an adjustable support system for releasably mounting one of the work platform and the caddy deck upon one of the first and second utility wagons, the adjustable support system comprising:
    at least one F-channel support frame adjustably secured to a bottom surface of the one of the work platform and the caddy deck;
    a plurality of elongated apertures extending through the at least one support frame perpendicular to a channel length; and
    a plurality of screws, each of the plurality of screws extending through a respective one of the plurality of elongated apertures, the plurality of screws capable of retaining the at least one F-channel in sliding engagement with the one of the work platform and the caddy deck.

6. The portable workstation system according to claim 1, wherein the workstation system in the transportation configuration is capable of providing organized transportation of tools of at least three different sizes by a single towing apparatus.

7. The portable workstation system according to claim 6, further comprising: a railing system capable of carrying items of between 6 to 18 feet long; an upper deck fastening system capable of carrying items of between 4 to 6 feet; an internal basket space capable of carrying items of between 2 to 4 feet; and a drawer capable of carrying items of less than 2 feet.

8. The portable workstation system according to claim 1, wherein the cart connector further comprising: a first bracket capable of releasably engaging the frame portion of the first utility wagon; a second bracket capable of releasably engaging the handle portion of the second utility wagon; and an extension shaft extending between the first bracket and the second bracket.

9. The portable workstation system according to claim 8, wherein the first bracket is an L-shaped bracket; the second bracket is a flat bracket having apertures at a first end; the extension shaft is an extension of a second end of the second bracket; and the first bracket is welded to the extension shaft opposite the second bracket.

10. A method for providing organized transportation of tools of at least three different sizes by a single towing apparatus, and providing a portable workstation system for a first utility wagon and a second utility wagon, the first utility wagon being pulled by the single towing apparatus; the method comprising:
  securely attaching a first frame portion of the first utility wagon to a second frame portion of the second utility wagon via a cart connector by:
    releasably engaging the first frame portion of the first utility wagon with a first bracket along one end of the cart connector, and
    releasably engaging the second frame portion of the second utility wagon with a second bracket of the cart connector, the second bracket being opposite the first bracket along an extension shaft;
  releasably engaging a work platform, having a tool drawer, on one of the first and the second utility wagons; and
  releasably securing a caddy deck onto an other of the first and the second utility wagons.

11. The method for providing a portable workstation system according to claim 10, the method further comprising:
  supporting a tool holster along an upwards working surface of the work platform; and
  accessing the tool drawer and a basket space by a hatch within the work platform via rotation of at least one lid of the work platform.

12. The method for providing a portable workstation system according to claim 10, the method further comprising:
  releasably securing the caddy deck onto the other of the first and the second utility wagons via supporting ribs along an underside of the caddy deck having a plurality of metal brackets spaced apart from one another;
  releasably securing and maintaining cords with fasteners attached to upward extending ribs along a periphery of the caddy deck; and
  creating a wind tunnel by providing a drainage aperture along an upper supporting surface of the caddy deck.

13. The method for providing a portable workstation system according to claim 10, the method further comprising facilitating moving the work platform from the first utility wagon to the second utility wagon, the first utility wagon having a width less than a width of the second utility wagon by:
  loosening screws adjustably supporting an F-channel support along a bottom surface of the work platform;
  sliding the F-channel support toward outer edges of the work platform until reaching a position corresponding to the width of the second utility wagon; and
  tightening the screws adjustably supporting the F-channel support.

14. The method for providing a portable workstation system according to claim 10, the method further comprising:
  converting the portable workstation system into a working configuration by disengaging the first frame portion of the first utility wagon from the second frame portion of the second utility wagon via the cart connector; and
  converting the portable workstation system back into a transporting configuration by re-engaging the first frame portion of the first utility wagon to the second frame portion of the second utility wagon via the cart connector.

15. A portable workstation system for use with a first utility wagon, having upwardly extending side rails, and a second utility wagon, having a convertible handle; the workstation system comprising at least two of:
  a cart connector capable of releasably engaging a frame portion of the first utility wagon and a handle portion of the second utility wagon;
  a work platform capable of being mounted upon one of the first and second utility wagons, the work platform having at least one lid capable of reversibly sealing and revealing a basket space accessible through a hatch within the work platform; and
  a caddy deck capable of being mounted upon an other one of the first and second utility wagons, the caddy deck having a drainage aperture at one mouth of a wind tunnel created by interaction of the caddy deck and the other one of the first and second utility wagons;
  wherein the workstation system being capable of transforming between a transportation configuration and a working configuration.

\* \* \* \* \*